(12) United States Patent
Goshi

(10) Patent No.: US 8,508,667 B2
(45) Date of Patent: Aug. 13, 2013

(54) IMAGE ENHANCING DEVICE, IMAGE ENHANCING METHOD, IMAGE ENHANCING PROGRAM AND SIGNAL PROCESSING DEVICE

(75) Inventor: Seiichi Goshi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 21 days.

(21) Appl. No.: 13/138,197

(22) PCT Filed: Oct. 14, 2009

(86) PCT No.: PCT/JP2009/067787
§ 371 (c)(1),
(2), (4) Date: Jul. 19, 2011

(87) PCT Pub. No.: WO2010/113342
PCT Pub. Date: Oct. 7, 2010

(65) Prior Publication Data
US 2011/0279730 A1 Nov. 17, 2011

(30) Foreign Application Priority Data
Mar. 31, 2009 (JP) ................................ 2009-088058

(51) Int. Cl.
*H04N 5/21* (2006.01)

(52) U.S. Cl.
USPC ........................................................ 348/627

(58) Field of Classification Search
USPC ................. 348/606, 607, 624, 625, 627, 630;
382/254, 260–266, 275
IPC ............................................ H04N 5/21, 5/208
See application file for complete search history.

(56) References Cited

U.S. PATENT DOCUMENTS 5,606,375 A * 2/1997 Lee ................................ 348/606
6,295,322 B1 9/2001 Arbeiter et al.
(Continued)

FOREIGN PATENT DOCUMENTS

GB 2 203 013 A 10/1998
JP 7-312704 A 11/1995
(Continued)

OTHER PUBLICATIONS

Matsumoto et al., "A Study on One Frame Reconstruction-based Super-resolution Using Image Segmentation", Technical Research Reports, The Institute of Electronics, Information and Communication Engineers, vol. 108, Issue 4 pp. 31-36, IE2008-6, Apr. 2008.

(Continued)

*Primary Examiner* — Sherrie Hsia
(74) *Attorney, Agent, or Firm* — Harness, Dickey & Pierce, P.L.C.

(57) ABSTRACT

In at least one embodiment of the present invention, quality of image is improved by sufficiently sharpening the image through an appropriate high-frequency compensation with a simple arrangement, not only for still images but also for moving images and even if the images have already undergone image enlarging processes. In at least one embodiment, an HPF extracts high-frequency components from an input image signal. A square operator generates a squared signal by squaring the first signal. A first differentiator generates a first differentiation signal by differentiating the squared signal. The second differentiator generates a second differentiation signal by differentiating the input image signal. A multiplier generates a second signal by multiplying the first differentiation signal by the second differentiation signal. An adder generates an output image signal by adding the second signal to the input image signal, as a compensation signal.

21 Claims, 16 Drawing Sheets

(56) References Cited

U.S. PATENT DOCUMENTS

| | | |
|---|---|---|
| 6,377,313 B1 | 4/2002 | Yang et al. |
| 2003/0151684 A1 | 8/2003 | Shimazaki et al. |
| 2007/0269137 A1 | 11/2007 | Ida et al. |
| 2008/0050032 A1 | 2/2008 | Okuno et al. |

FOREIGN PATENT DOCUMENTS

| | | |
|---|---|---|
| JP | 9319869 A | 12/1997 |
| JP | 2006-304352 A | 11/2006 |
| JP | 2007-310837 A | 11/2007 |
| JP | 2008-103785 A | 5/2008 |
| WO | WO-02084997 A1 | 10/2002 |

OTHER PUBLICATIONS

Vese et al., "Modeling Textures with Total variation Minimization and Oscillating Patterns in Image Processing", Journal of Scientific Computing, vol. 19, Nos. 1-3, Dec. 2003.

* cited by examiner

Fig.26
(A)
(B)
Fig.27
(A)
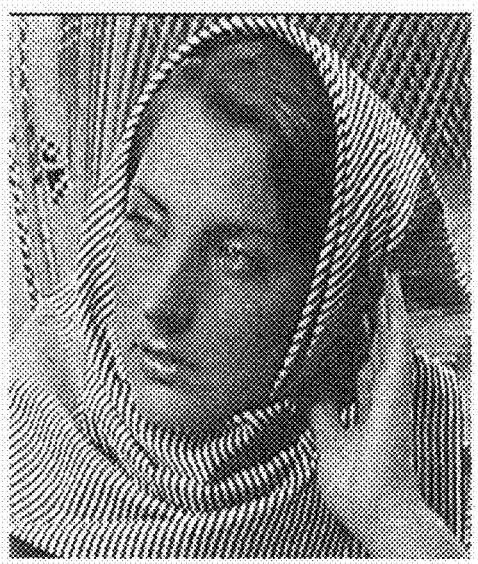
(B)

IMAGE ENHANCING DEVICE, IMAGE ENHANCING METHOD, IMAGE ENHANCING PROGRAM AND SIGNAL PROCESSING DEVICE

TECHNICAL FIELD

The present invention relates to image enhancing devices, image enhancing methods and image enhancing programs for improved quality of image through sharpening the image. More generally, the present invention relates to signal processing devices or the like for improved signal quality, such as an image enhancing device suitable for sharpening moving images displayed in real time in television (TV) receivers for example.

BACKGROUND ART

Image enhancement for improved quality of image through sharpening the image has been widely known. For example, conventional television receivers may utilize a contour compensation technique for enhancing rising-edge/trailing-edge steepness in image signals which represent contours of the images to be displayed. In the contour compensation, high-frequency components are extracted from video signals (brightness signals) before they are inputted to the television receiver display device. The high-frequency components are amplified and then added to the video signal, whereby improved visual quality of the displayed image is achieved through improvement in frequency characteristics of the degraded video signals after various processes performed in a number of circuits from initial input to the receiver to final input to the display device.

Conventional image enhancement techniques including the contour compensation as described above are generally based on linear digital-signal processing, and for this reason none of these techniques can make use of any frequency components which have higher frequencies than the Nyquist frequency, i.e. any frequency components which have higher frequencies than a half of the sampling frequency of a target image. Consequently, it has been impossible to restore frequency components which have higher frequencies than the Nyquist frequency for improved quality of image, or to accomplish sharpening of the image by utilizing such frequency components. As a result, there has been a problem in HDTV television (High Definition Television) for example. Specifically, in the "Full High-Vision" (1080×1920 pixels) television sets, when image resolution of the incoming image signals is lower than that of the HDTV and an image enlarging process is performed in the display device, the resulting images are blurred images. Since these blurred images do not have near-Nyquist frequency components, none of the conventional image enhancement techniques are capable of extracting target frequency components for amplification, and therefore it has been impossible to improve the quality of these images.

In an attempt to solve the problem, different approaches are being taken. One example is an attempt to utilize inter-frame or intra-frame self-correlation, etc. (see Non-patent Document 1 and Patent Document 3 for example) in order to enhance the resolution so that sharp images will be obtained even if image enlarging processes as described above have already been performed. Another example is an attempt to utilize anisotropy diffusion filters (see Non-patent Document 2 for example) in order to smooth the edges in their tangential directions to a certain degree while smoothing the edges in the vertical direction to a certain different degree. Still another example is an image processing device (Patent Document 1) which utilizes nonlinear circuits for adjusting coring amount, clipping amount, enhancing amount, limitation amount, etc. of a signal to be added to the image signal in order to emphasize high-frequency components for improved quality of the image. Also, there is proposed an image quality compensation circuit which utilizes nonlinear conversion circuits (Patent Document 2) for ringing suppression at edge portions of the pulse or step waveforms in the image signals, with an object of compensating for high-frequency signals without sacrificing the quality level of the image.

DOCUMENTS ON PRIOR ART

Patent Documents

Patent Document 1: JP-A 2006-304352 Gazette
Patent Document 2: JP-A H7-312704 Gazette
Patent Document 3: JP-A 2007-310837 Gazette

Non-Patent Documents

Non-patent Document 1: "A Study on One Frame Reconstruction-based Super-resolution Using Image Segmentation", by Nobuyuki Matsumoto and Takashi Ida, Technical Research Reports, The Institute of Electronics, Information and Communication Engineers, Vol. 108, Issue 4 pp. 31-36, IE2008-6, April 2008.

Non-patent Document 2: "Modeling Textures with Total variation Minimization and Oscillating Patterns in Image Processing", by Luminita A. Vese and Stanley J. Osher, Journal of Scientific Computing, Vol. 19, Nos. 1-3, December 2003.

SUMMARY OF THE INVENTION

Problems to be Solved by the Invention

However, the resolution enhancement technique which uses an anisotropy diffusion filters, and is disclosed in Non-patent Document 2, requires complicated processes, and is not applicable to such cases as displaying moving images in television receivers where real-time processing is required. The resolution enhancement technique disclosed in Non-patent Document 1 may be applicable but at a large cost increase since it requires a massive LSI. The image processing device in Patent Document 1 and the image quality compensation circuit in Patent Document 2 make use of nonlinear processing only for limited purposes such as clipping operation of a signal to be added to the image signal, ringing suppression in compensating for high-frequency signals, etc. Such an image quality compensation circuit or an image processing device cannot achieve sufficient image sharpening when displaying images which have undergone image enlarging processes as described above.

It is therefore an object of the present invention to provide image enhancing devices, image enhancing methods, etc. which are capable of providing sufficient image sharpening thereby improving quality of image not only for still images but also for moving images and for cases where these images have already undergone image enlarging processes such as the one described above, through appropriate high-frequency compensation with simple arrangement. More generally, it is an object of the present invention to provide signal processing devices, etc. which are capable of improving signal quality through appropriate high-frequency compensation with simple arrangement.

Means for Solving the Problems

The first aspect of the present invention provides an image enhancing device for sharpening an image represented by an input signal, which comprises:

a filter section for generating a first signal by removing, from an input signal which represents an image, at least a DC component of frequency components contained in the input signal;

a nonlinear processor for generating a second signal by performing a nonlinear process to the first signal; and an adder section for adding the second signal to the input signal.

In this arrangement, the nonlinear processor generates a third signal based on the first signal, the third signal making monotonic increase in a broad sense, nonlinearly or in positive-negative symmetry with respect to the first signal at least in the neighborhood of zero, and generates the second signal based on the third signal so that positive and negative signs in the first signal are substantially preserved in the second signal while the second signal does not contain a DC component.

The second aspect of the present invention provides the image enhancing device according to the first aspect of the present invention, wherein the nonlinear processor generates the third signal by raising the first signal to a predetermined power whose exponent is two or a greater even number, and generates the second signal based on the third signal so that positive and negative signs in the first signal are substantially preserved in the second signal.

The third aspect of the present invention provides the image enhancing device according to the second aspect of the present invention, wherein the nonlinear processor includes:

a power operator for generating the third signal by raising the first signal to a predetermined power whose exponent is two or a greater even number;

a first differentiator for generating a fourth signal by differentiation of the third signal;

a second differentiator for generating a fifth signal by differentiation of the input signal; and a multiplier for generating the second signal based on a product of the fourth signal and the fifth signal.

The fourth aspect of the present invention provides the image enhancing device according to the second aspect of the present invention, wherein the nonlinear processor includes:

a power operator for generating the third signal by raising the first signal to a predetermined power whose exponent is two or a greater even number; and a sign converter for reversing positive or negative signs in the third signal based on the first signal if the positive or the negative signs are different from corresponding ones in the first signal, for generation of the second signal based on the third signal.

The fifth aspect of the present invention provides the image enhancing device according to the second aspect of the present invention, wherein the nonlinear processor includes:

a power operator for generating the third signal by raising the first signal to a predetermined power whose exponent is two or a greater even number;

a filter for generating a fourth signal by removing a DC component from the third signal; and a sign converter for reversing positive or negative signs in the fourth signal based on the first signal if the positive or the negative signs are different from corresponding ones in the first signal, for generation of the second signal based on the fourth signal.

The sixth aspect of the present invention provides the image enhancing device according to the first aspect of the present invention, wherein the nonlinear processor generates, as the third signal, a signal representing an absolute value of the first signal, and generates the second signal based on the third signal so that positive and negative signs in the first signal are substantially preserved in the second signal.

The seventh aspect of the present invention provides the image enhancing device according to the sixth aspect of the present invention, wherein the nonlinear processor includes:

an absolute-value processor for generating, as the third signal, a signal representing an absolute value of the first signal;

a first differentiator for generating a fourth signal by differentiation of the third signal;

a second differentiator for generating a fifth signal by differentiation of the input signal; and a multiplier for generating the second signal based on a product of the fourth signal and the fifth signal.

The eighth aspect of the present invention provides the image enhancing device according to the sixth aspect of the present invention, wherein the nonlinear processor includes:

an absolute-value processor for generating, as the third signal, a signal representing an absolute value of the first signal;

a filter for generating a fourth signal by removing a DC component from the third signal; and a sign converter for reversing positive or negative signs in the fourth signal based on the first signal if the positive or the negative signs are different from corresponding ones in the first signal, for generation of the second signal based on the fourth signal.

The ninth aspect of the present invention provides the image enhancing device according to the first aspect of the present invention, wherein the nonlinear processor generates the third signal by first raising the first signal to a predetermined power whose exponent is three or a greater odd number and then generates the second signal based on the third signal.

The tenth aspect of the present invention provides the image enhancing device according to the ninth aspect of the present invention, wherein the nonlinear processor includes:

a power operator for generating the third signal by raising the first signal to a predetermined power whose exponent is three or a greater odd number; and an adjuster for generating the second signal by adjusting an amplitude of the third signal.

The eleventh aspect of the present invention provides the image enhancing device according to the first aspect of the present invention, wherein the nonlinear processor generates the third signal so that an absolute value of the third signal are greater than an absolute value of the first signal at least over a range in the above-mentioned neighborhood of zero.

The twelfth aspect of the present invention provides the image enhancing device according to the first aspect of the present invention, wherein the nonlinear processor generates the third signal based on the first signal, the third signal making monotonic increase in a broad sense, nonlinearly or in positive-negative symmetry with respect to the first signal at least in a range where the first signal has an amplitude not greater than a half of its maximum amplitude.

The thirteenth aspect of the present invention provides the image enhancing device according to the first aspect of the present invention, wherein the filter section includes a high-frequency passing type digital filter with three or a greater number of taps.

The fourteenth aspect of the present invention provides the image enhancing device according to the first aspect of the present invention, wherein the nonlinear processor includes:

a rounder for replacing a signal value of a part of the first signal with zero if the signal value has an absolute value smaller than a predetermined lower limit value; and a limiter for replacing a signal value of a part of the first signal with a predetermined replacement value if the signal value has an absolute value greater than a predetermined upper limit value, the predetermined replacement value having an absolute value not greater than the upper limit value.

The fifteenth aspect of the present invention provides the image enhancing device according to the first aspect of the present invention, wherein the nonlinear processor includes an adjuster for adjusting an amplitude of the second signal.

Other aspects of the present invention will not be described here since they will become clear from the first through the fifteenth aspects described above and descriptions regarding the embodiments which will be given later.

Advantages of the Invention

According to the first aspect of the present invention, a signal made by removing DC components from an input signal is generated as a first signal. By performing nonlinear processing to the first signal, a second signal is generated. More specifically, a third signal is generated which makes monotonic increase in a broad sense, nonlinearly or in positive-negative symmetry with respect to the first signal at least in the neighborhood of zero, and based on this third signal the second signal is generated. Positive and negative signs in the first signal are preserved in the second signal and in addition, the second signal does not contain DC components. The second signal as described is added to the input signal. The signal obtained by the addition is an output signal from the image enhancing device. Because the nonlinear process performed to the first signal yields harmonics of the original signal, the output signal contains frequency components of higher frequencies than a Nyquist frequency fs/2 which is the Nyquist frequency of a sampling frequency fs used to make discrete signals from the input signal. For this reason, greater improvement is possible in the quality of image than conventional image enhancing devices which are based on linear processing. Also, since it is possible to provide sufficient sharpening of images with a simple arrangement, it is now possible to improve the quality of image not only for still images but also for moving images which are displayed in real time, without a large cost increase. Further, in cases where the input signal is provided by an image signal which has undergone image enlarging processes, the first aspect of the present invention provides remarkable improvement in the quality of image by accomplishing sufficient sharpening of the image which has already undergone the enlarging processes as compared to conventional image enhancing devices which are not capable of compensating high-frequency ranges beyond the Nyquist frequency fs/2.

According to the second aspect of the present invention, the first signal is raised to the power whose exponent is two or a greater even number. Based on this power calculation the second signal is generated so that positive and negative signs in the first signal are preserved in the second signal, and this second signal is added to the input signal. Therefore, greater improvement is possible in the quality of image than conventional image enhancing devices which are based on linear processing. Also, since it is possible to provide sufficient sharpening of images with a simple arrangement, it is now possible to improve the quality of image not only for still images but also for moving images which are displayed in real time, without a large cost increase. Further, in cases where the input signal is provided by an image signal which has undergone image enlarging processes, the second aspect of the present invention provides greater performance than conventional image enhancing devices, in quality improvement of image by sharpening the image.

According to the third aspect of the present invention, the first signal is raised to the power whose exponent is two or a greater even number, to generate a third signal. By differentiating the third signal, a fourth signal is generated which does not contain DC components. Meanwhile, the input signal is differentiated to obtain a fifth signal, which is multiplied by the fourth signal, to generate a second signal in which positive and negative signs in the first signal are preserved. As described, generation of the second signal as a compensation signal to be added to the input signal is based on the first signal to the power of two or a greater even number and on preservation of positive and negative signs found in the first signal. Therefore, the third aspect of the present invention provides the same advantages as offered by the second aspect of the present invention.

According to the fourth aspect of the present invention, the first signal is raised to the power whose exponent is two or a greater even number, to generate a third signal. The second signal is generated based on the third signal, by reversing positive or negative signs in the third signal based on the first signal if these positive or negative signs are different from corresponding ones in the first signal. As described, generation of the second signal which is to be added to the input signal is based on the first signal to the power of two or a greater even number and on preservation of positive and negative signs found in the first signal. Therefore, the fourth aspect of the present invention provides the same advantages as offered by the second aspect of the present invention.

According to the fifth aspect of the present invention, the first signal is raised to the power whose exponent is two or a greater even number, to generate the third signal. By removing DC components from the third signal, the fourth signal is generated. The second signal is generated based on the fourth signal, by reversing positive or negative signs in the fourth signal based on the first signal if these positive or the negative signs are different from corresponding ones in the first signal. As described, generation of the second signal which is to be added to the input signal is based on the first signal to the power of two or a greater even number and on preservation of positive and negative signs found in the first signal. Therefore, the fifth aspect of the present invention provides the same advantages as offered by the second aspect of the present invention. Further, since the second signal is generated from the signal which is obtained from the third signal by removing DC components, the fifth aspect of the present invention provides a higher level of compensation, and is capable of sharpening the image to a greater degree than the fourth aspect of the present invention.

According to the sixth aspect of the present invention, the second signal is generated based on absolute values of the first signal, and therefore the second signal contains harmonic components which have frequencies two or greater times the frequencies of the frequency components in the input signal. Also, the second signal is generated so that positive and negative signs in the first signal are preserved in the second signal. By adding the second signal as described above to the input signal, greater improvement becomes possible in the quality of image than conventional image enhancing devices which are based on linear processing. Also, since it is possible to provide sufficient sharpening of images with a simple arrangement, it is now possible to improve the quality of image not only for still images but also for moving images which are displayed in real time, without a large cost increase. Further, in cases where the input signal is provided by an image signal which has undergone image enlarging processes, the sixth aspect of the present invention provides greater performance than conventional image enhancing devices, in quality improvement of image by sharpening the image.

According to the seventh aspect of the present invention, a signal representing absolute values of the first signal is generated as the third signal. By differentiating the third signal, the fourth signal which does not contain DC components is generated. Meanwhile, the input signal is differentiated to obtain the fifth signal, which is then multiplied by the fourth signal, to generate the second signal in which positive and negative signs in the first signal are preserved. As described, generation of the second signal which is to be added to the input signal is based on the absolute value of the first signal and on preservation of positive and negative signs found in the first signal. Therefore, the seventh aspect of the present invention provides the same advantages as offered by the sixth aspect of the present invention.

According to the eighth aspect of the present invention, a signal representing absolute values of the first signal is generated as the third signal. By removing DC components from the third signal, the fourth signal is generated. Then, the second signal is generated based on the fourth signal, by reversing positive or negative signs in the fourth signal based on the first signal if these positive or negative signs are different from corresponding ones in the first signal. As described, generation of the second signal which is to be added to the input signal is based on the absolute value of the first signal and on preservation of positive and negative signs found in the first signal. Therefore, the eighth aspect of the present invention provides the same advantages as offered by the sixth aspect of the present invention.

According to the ninth aspect of the present invention, the first signal is raised to the power whose exponent is three or a greater odd number, to generate the second signal, and in this second signal, positive and negative signs in the third signal are preserved. As described, generation of the second signal which is to be added to the input signal is based on the first signal to the power of three or a greater odd number, so no particular process is required for the preservation of positive and negative signs found in the first signal. Consequently, greater improvement becomes possible with simpler arrangement, in the quality of image than conventional image enhancing devices which are based on linear processing. Also, since it is possible to provide sufficient sharpening of images with a simple arrangement, it is now possible to improve the quality of image not only for still images but also for moving images which are displayed in real time, without a large cost increase. Further, in cases where the input signal is provided by an image signal which has undergone image enlarging processes, the ninth aspect provides greater performance than conventional image enhancing devices, in quality improvement of image by sharpening the image.

According to the tenth aspect of the present invention, the first signal is raised to the power whose exponent is three or a greater odd number, to generate the third signal, and the second signal is generated by adjusting an amplitude of the third signal. This means that even if the third signal has an excessive amplitude (signal level) as a result of the power operation of the first signal, the second signal which has an appropriate amplitude is added to the input signal. Therefore, appropriate sharpening is possible for an image represented by the input signal.

According to the eleventh aspect of the present invention, absolute values of the third signal are greater than absolute values of the first signal at least over a range in the above-mentioned neighborhood of zero. Therefore, sufficient sharpening of image is possible by adding the second signal generated from the third signal based on this range.

According to the twelfth aspect of the present invention, the third signal makes monotonic increase in a broad sense, nonlinearly or in positive-negative symmetry with respect to the first signal at least in a range where the first signal has an amplitude not greater than a half of its maximum amplitude. Thus, the second signal generated as a compensation signal contains sufficient amount of frequency components for use in the compensation, and therefore sufficient sharpening is possible for an image represented by the input signal, by adding the second signal to the input signal.

According to the thirteenth aspect of the present invention, the filter section is provided by a high-frequency passing type digital filter with three or greater number of taps. Hence, the first signal generated contains frequency components for use in the compensation, and therefore excellent sharpening is possible for an image represented by the input signal, by adding the second signal to the input signal.

According to the fourteenth aspect of the present invention, signal values having an absolute value smaller than a predetermined lower limit value are changed to zero, which means that noises contained in the input signal are not amplified in the nonlinear process performed to the first signal. Also, signal values having an absolute value greater than a predetermined upper limit value are changed to a predetermined value having an absolute value not greater than the upper value. This means that those signal components which already have sufficient energy as high-frequency components are not unnecessarily amplified in the nonlinear process performed to the first signal. Based on the first signal which is prepared as described above, the second signal is generated. Therefore, excellent sharpening is possible for an image represented by the input signal, by adding the second signal to the input signal.

According to the fifteenth aspect of the present invention, an amplitude of the second signal which is to be added as a compensation signal to the input signal is adjusted, whereby appropriate compensation is performed to the input signal. Therefore, excellent sharpening is possible for an image represented by the input signal, by adding the second signal to the input signal.

BRIEF DESCRIPTION OF THE DRAWINGS

FIG. 26 shows, together with the object image (A), an image (B) after the object image was processed by a conventional image enhancing device.

FIG. 27 shows an image (A) after the object image was processed by an image enhancing device according to the second embodiment, whereas an image (B) is an image after the object image was processed by the image enhancing device according to the third embodiment.

MODES FOR EMBODYING THE INVENTION

Hereinafter, embodiments of the present invention will be described with reference to the attached drawings.

1. First Embodiment 1.1 Configuration

Figure 1:
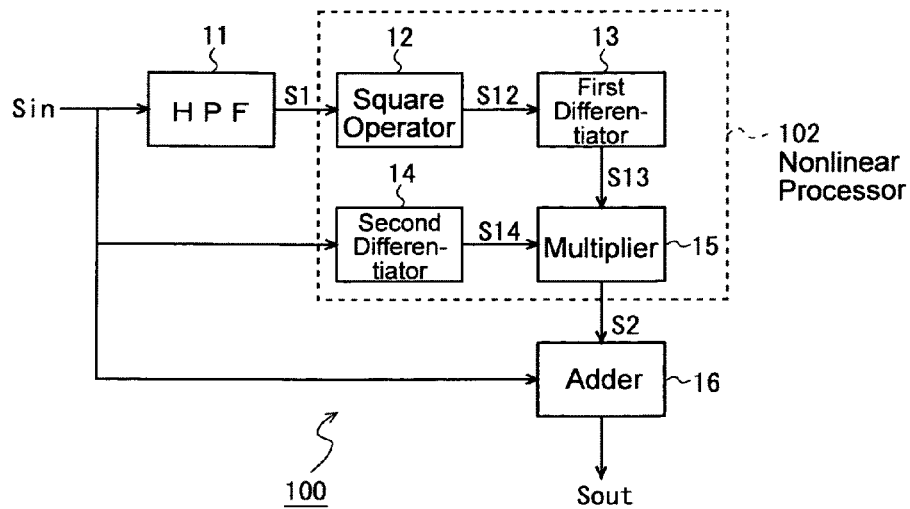
FIG. 1 is a block diagram showing a configuration of an image enhancing device according to a first embodiment of the present invention.

FIG. 1 is a block diagram showing a configuration of an image enhancing device according to a first embodiment of the present invention. This image enhancing device 100 performs, to an input image signal Sin which is inputted as a digital signal that represents an image, a process (hereinafter called "image enhancement" or simply "enhancement") for sharpening the image represented by the input image signal Sin; and includes a high-frequency passing filter (hereinafter called "high pass filter" or "HPF") 11, a nonlinear processor 102, and an adder 16. The nonlinear processor 102 includes a square operator 12, a first differentiator 13, a second differentiator 14 and a multiplier 15. The input image signal Sin is supplied to the HPF 11, the second differentiator 14 and the adder 16. The image represented by the input image signal Sin may be a still image or a moving image. In the case where the input image signal Sin represents a movie, the movie may be of SDTV (Standard Definition Television) or HDTV (High Definition Television) to be displayed in real time in these television receivers. This applies to all of the other embodiments, too.

Figure 2:
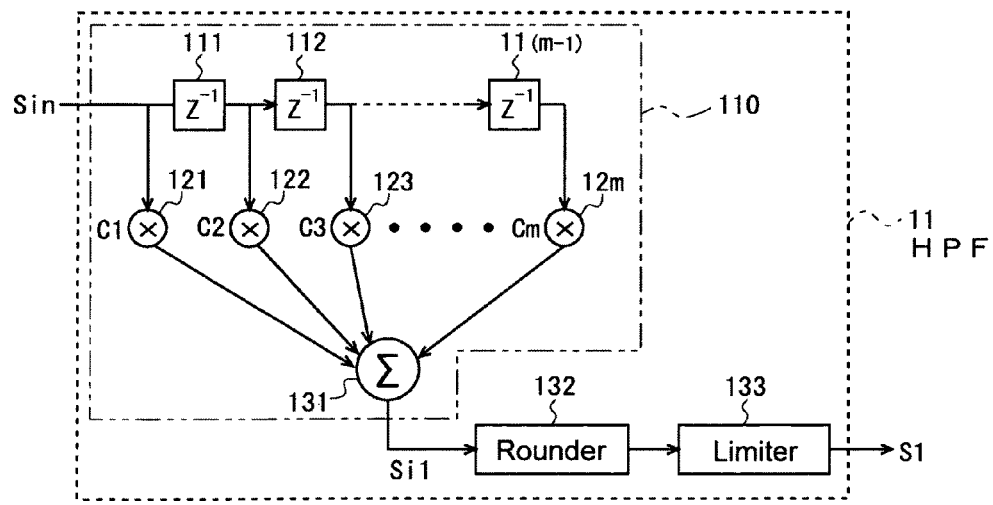
FIG. 2 is a block diagram showing a configuration of a high pass filter (high-frequency passing filter) in the first embodiment.
Figure 5:
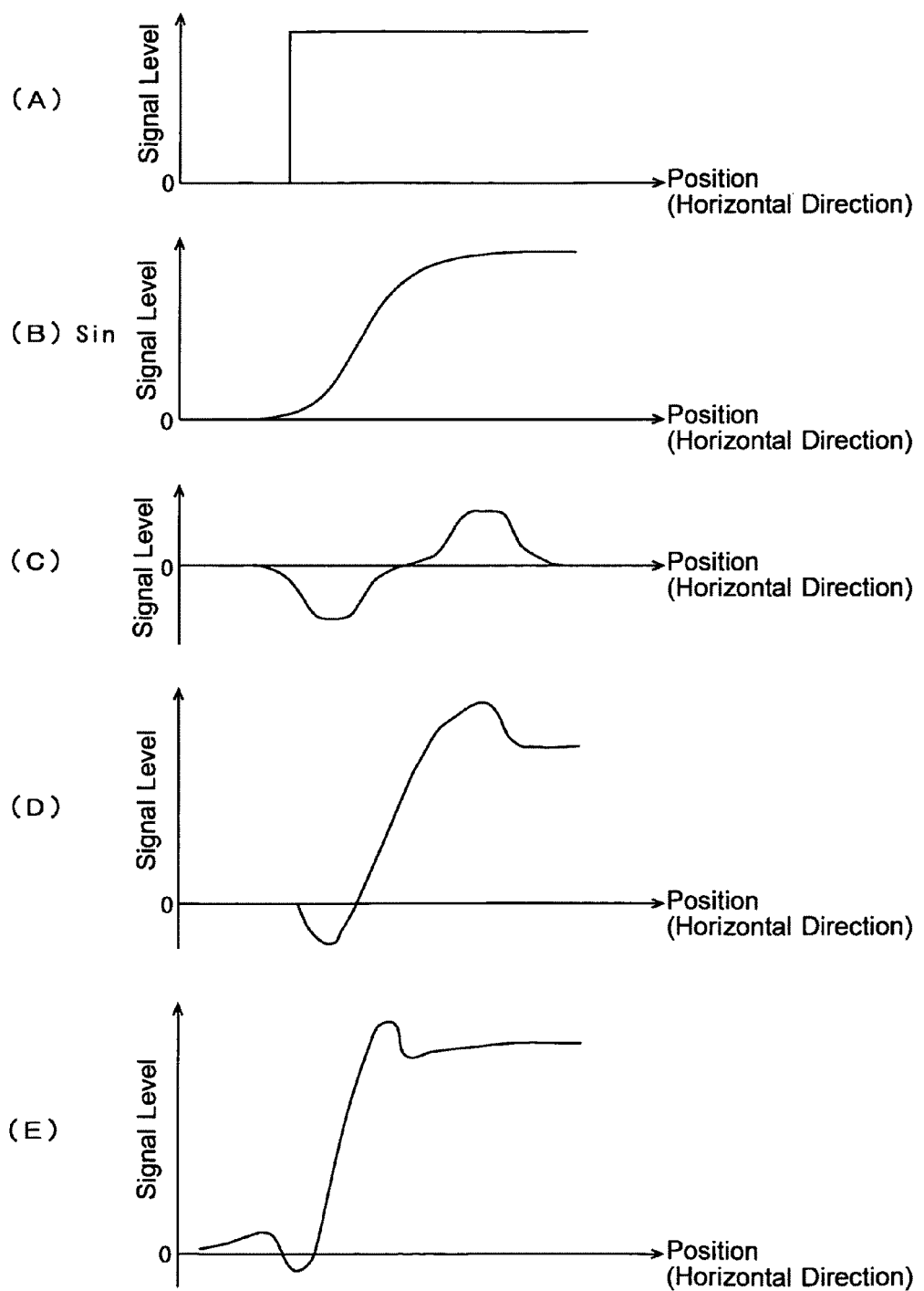
FIG. 5 includes signal waveform charts (A through E) for describing an operation of a conventional image enhancing device.

The HPF 11 extracts high-frequency components which contain contour components in the image represented by the input image signal Sin. FIG. 2 is a block diagram which shows a configuration of this HPF 11. As shown in FIG. 2, the HPF has an m-tap (m≧3) transversal digital filter 110 which is constituted by m−1 unit-delay elements 111, 112, . . . , 11 (m−1); m multipliers 121, 122, . . . , 12m; and an adder 131. In addition, the HPF has a rounder 132 and a limiter 133. Each multiplier 12j multiplies an incoming signal by a coefficient Cj (j=1 through m), and outputs the result of multiplication to the adder 131. The coefficients C1 through Cm are set to such values that the digital filter 110 in the HPF 11 functions as a high pass filter for extracting high-frequency components which contain the contour components mentioned above. For example, in a case where m=3, C1=0.5, C2=−1, and C3=0.5, the digital filter 110 which receives an input image signal Sin as shown in FIG. 5(B) to be described later outputs a signal as shown in FIG. 5(C) as a high-frequency component signal Si1. The high-frequency component signal Si1 obtained in this way goes through the rounder 132 and the limiter 133, and then is outputted from the HPF 11 as a first signal S1.

The rounder 132 prevents noises from being amplified by the nonlinear processor 102 in the next step, by rounding signal values which are not higher than a predetermined lower limit value in the high-frequency component signal Si1. For example, in a case where the input image signal Sin can take a value from a range of 0 through 255, i.e. when the signal is a 256-tone image signal, signal values not greater than 2 are rounded to zero. The limiter 133 prevents signals which already have sufficient energy as high-frequency components from unnecessary amplification by the nonlinear processor 102 in the next step, by changing those signal values which are higher than a predetermined upper limit value to a predetermined value which is not higher than the above-mentioned upper limit value (e.g. zero or the upper limit value itself). For example, in a case where the input image signal Sin can take a value from a range of 0 through 255, signal values greater than 64 in its absolute value are changed to a signal value of zero; or signal values greater than 64 in its absolute value are changed to a signal value of plus or minus 64 depending on their original sign.

Figure 3:
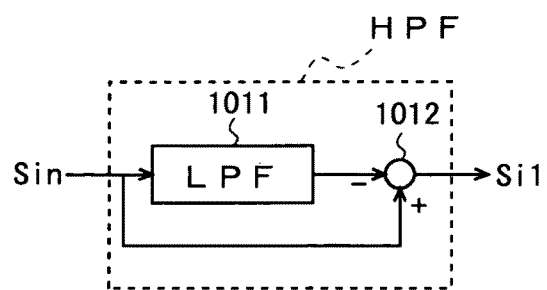
FIG. 3 is a block diagram showing another configuration of the high pass filter in the first embodiment.

Now, in general, it is easier to implement a low-pass filter than implementing a high pass filter. Therefore, a low-pass filter (hereinafter called "LPF") 1011 and a subtractor 1012 may be used as shown in FIG. 3 to implement a digital filter 110 as a high pass filter shown in FIG. 2.

Figure 4:
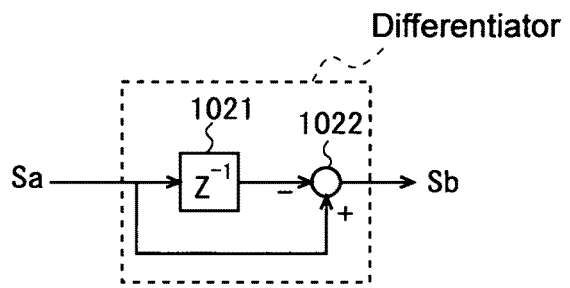
FIG. 4 is a block diagram showing a configuration of a differentiator in the first embodiment.

The first signal S1 outputted from the HPF 11 is inputted to the square operator 12 of the nonlinear processor 102. The square operator 12 squares the first signal S1 and thereby generates a squared signal S12; namely, $S12=S1^2$. More specifically, since the first signal S1 is a digital signal (discrete signal), the first signal S1 can be expressed as a data string given by X1, X2, X3, ..., and then the squared signal S12 can be expressed as a digital signal composed of a data string given by $X1^2, X2^2, X3^2$. The squared signal S12 is inputted to the first differentiator 13. The differentiator 13 differentiates the squared signal S12 and thereby generates a first differentiation signal S13. The first differentiation signal S13 is inputted to the multiplier 15. Since the squared signal S12 is a digital signal and is discrete, the first differentiator 13 generates the first differentiation signal S13 by calculating backward differences using a circuit as shown in FIG. 4 for example. The arrangement in FIG. 4 uses a unit-delay element 1021 and a subtractor 1022 to implement a differentiator, where a digital signal Sb is obtained by differentiating a digital signal Sa.

On the other hand, the nonlinear processor 102 includes the second differentiator 14, which differentiates the input image signal Sin and thereby generates a second differentiation signal S14. The second differentiation signal S14 is inputted to the multiplier 15, too. The second differentiator 14 is also implemented by an arrangement as shown in FIG. 4 for example.

The multiplier 15 multiplies the first differentiation signal S13 by the second differentiation signal S14 and thereby generates a second signal S2; namely, S2=S13×S14. More specifically, since both of the first and the second differentiation signals S13, S14 are digital signals (discrete signals), the first differentiation signal S13 can be expressed as a data string given by U1, U2, U3, ..., while the second differentiation signal S14 can be expressed as a data string given by V1, V2, V3, .... Then, the second signal S2 is a digital signal composed of a data string given by U1·V1, U2·V2, U3·V3, .... The second signal S2 is outputted from the nonlinear processor 102 and then inputted to the adder 16. It should be noted here that in order to handle delays caused by the processes performed in the HPF 11, the square operator 12, the first and the second differentiator 13, 14 the multiplier 15 includes delay elements as necessary for timing adjustment between the first differentiation signal S13 and the second differentiation signal S14.

The adder 16 adds the second signal S2 as an image-sharpening compensation signal to the input image signal Sin, and thereby generates an output image signal Sout; namely, Sout=Sin+S2. The adder 16 also includes delay elements as necessary for timing adjustment between the input image signal Sin and the second signal S2. Also, preferably the compensation signal provided by the second signal S2 has its level (amplitude) adjusted by at least one of a gain controller and a limiter, which should be provided within the adder 16 or between the multiplier 15 and the adder 16. The gain controller herein multiplies the incoming signal by a constant α, which satisfies $0 \leq \alpha \leq 1$, thereby adjusting the level of the incoming signal whereas the limiter adjusts the level of the signal by changing the absolute value of the incoming signal to a predetermined upper limit value (but not changing the plus or minus sign) if the incoming signal has an absolute value which is greater than the predetermined upper limit value.

The output image signal Sout generated in the adder 16 is outputted from the image enhancing device 100 as an image signal which represents a sharpened image of the image represented by the input image signal Sin.

1.2 Operation

Next, description will cover an operation of an image enhancing device 100 according to the present embodiment which is arranged as the above. The description will focus on a process to be performed to a portion of the input image signal Sin as shown in FIG. 5(B), which represents an edge where the level (pixel value) of the image signal changes in the horizontal direction.

For comparison, an operation of a conventional image enhancing device will be described first. An edge-representing portion in the input image signal is ideally a signal as shown in FIG. 5(A). In reality, however, the signal takes a form as shown in FIG. 5(B) due to hardware characteristics involving processing and transmission of the image signal. When an input image signal as shown in FIG. 5(B) is given to a conventional image enhancing device, a high-frequency signal as shown in FIG. 5(C) is extracted by an HPF which functions similarly to the one in the present embodiment. The high-frequency signal is added to the input image signal, to generate a signal as shown in FIG. 5(D) as an output image signal. This output image signal rises more sharply in its edge-representing portion than the input image signal in FIG. 5(B), and therefore sharpens the image. However, the rise of the edge-representing portion in the output image signal is less steep than that of an output image signal (FIG. 5(E)) according to the present embodiment to be described next.

Figure 6:
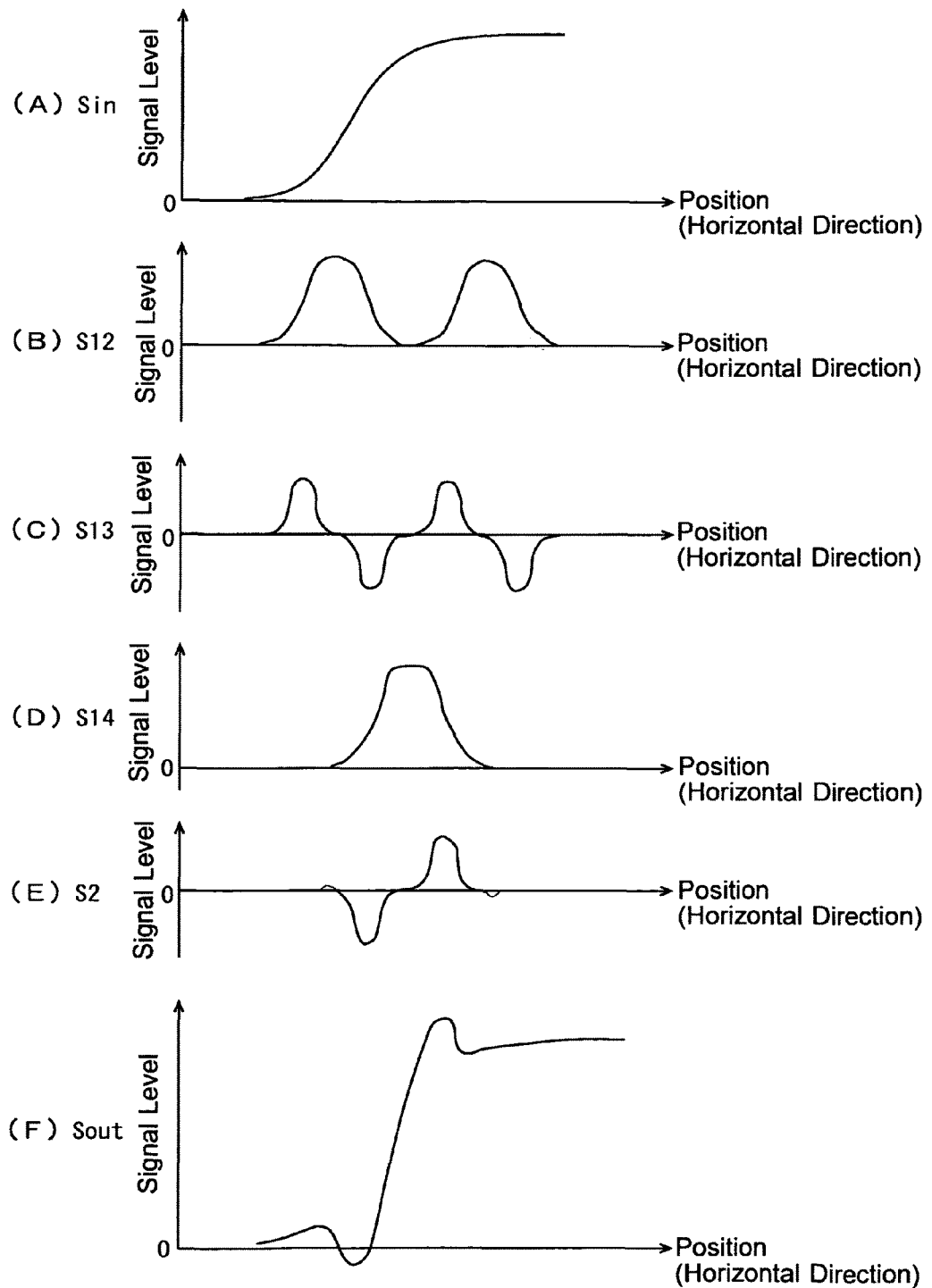
FIG. 6 includes signal waveform charts (A through F) for describing an operation of the image enhancing device according to the first embodiment.

In the present embodiment, when an input image signal Sin as shown in (FIG. 6(A)), which is the same signal as in FIG. 5(B), is given, the HPF 11 generates a first signal S1 which is equivalent to the one in FIG. 5(C). From the first signal S1, the square operator 12 generates a squared signal S12 as shown in FIG. 6(B), and from this squared signal S12, the first differentiator 13 generates a first differentiation signal S13 as shown in FIG. 6(C). During the differentiation process of the squared signal S12, DC components are removed.

Meanwhile, from the incoming image signal Sin, the second differentiator 14 generates a second differentiation signal S14 as shown in FIG. 6(D). From this second differentiation signal S14 and the first differentiation signal S13, the Multiplier 15 generates a second signal S2 as shown in FIG. 6(E). The second signal S2 is added as a compensation signal to the input image signal Sin by the adder 16, to generate an output image signal Sout as shown in FIG. 6(F). As described above, this output image signal Sout has an edge-representing portion which rises more sharply than the edge-representing portion (FIG. 5(D)) of the image output signal generated by the conventional image enhancing device, and therefore gives a sharper image than the convention.

As understood from the above description, the second signal S2 which is added as a compensation signal is obtained from the first signal S1 (FIG. 5(C)) which is outputted from the HPF 11 as a high-frequency signal, by performing thereto a nonlinear process. Also, the second signal S2 does not contain DC components since they have been removed by the first differentiator 13. Further, the second differentiation signal S14 obtained by the second differentiator 14 is multiplied by the first differentiation signal S13, whereby the positive and negative signs in the first signal (FIG. 5(C)) are substantially preserved in the second signal S2 (FIG. 6(E)). In other words, no positive portions in the first signal are converted into negative in the second signal S2, or no negative portions in the first signal are converted into positive in the second signal S2. According to the present embodiment, sufficient image sharpening is possible (see FIG. 6(F)) based on nonlinearity in the process performed to the first signal S1 and on preservation of the positive and negative signs which are found in the first signal S1. It should be noted here that depending on the result of multiplication of the first differentiation signal S13 by the second differentiation signal S14, there can be cases where the positive and negative signs in the first signal S1 are not preserved perfectly in the second signal S2 (see tiny waves in the fine line shown in FIG. 6(E)). However, these do not act as substantial detriment in the image sharpening provided by the addition of the second signal S2 to the input image signal Sin (see FIG. 6(F)).

Next, description will cover a case where image enlarging processes have been performed to a digital image signal and this image signal is supplied to the image enhancing device as an input image signal Sin. An operation of the present embodiment will be described in comparison with a case where the image signal has not undergone an image enlarging process.

Figure 7:
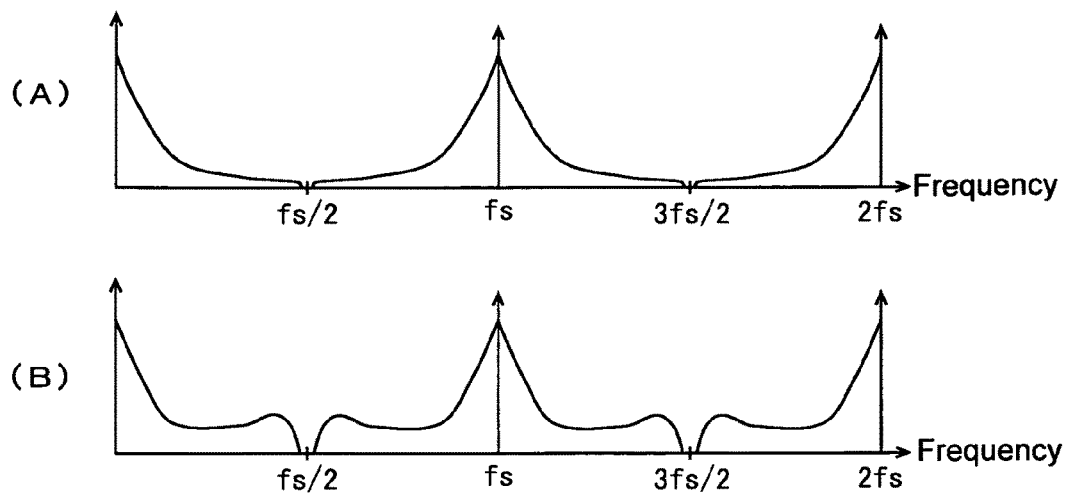
FIG. 7 includes frequency spectrum charts (A and B) for describing an operation of the conventional image enhancing device.

FIG. 7(A) shows frequency spectra of a digital image signal of a sampling frequency of fs. When this digital image signal receives an enhancement process for sharpened image performed by a conventional image enhancing device, the resulting digital image signal (hereinafter called "conventionally enhanced image signal") has frequency spectra as shown in FIG. 7(B). As has been described already, the enhancement process for sharpened image has added high-frequency components of the input image signal, and as shown in FIG. 7(B), the enhanced image signal shows increases over a frequency component range near the Nyquist frequency fs/2.

Figure 8:
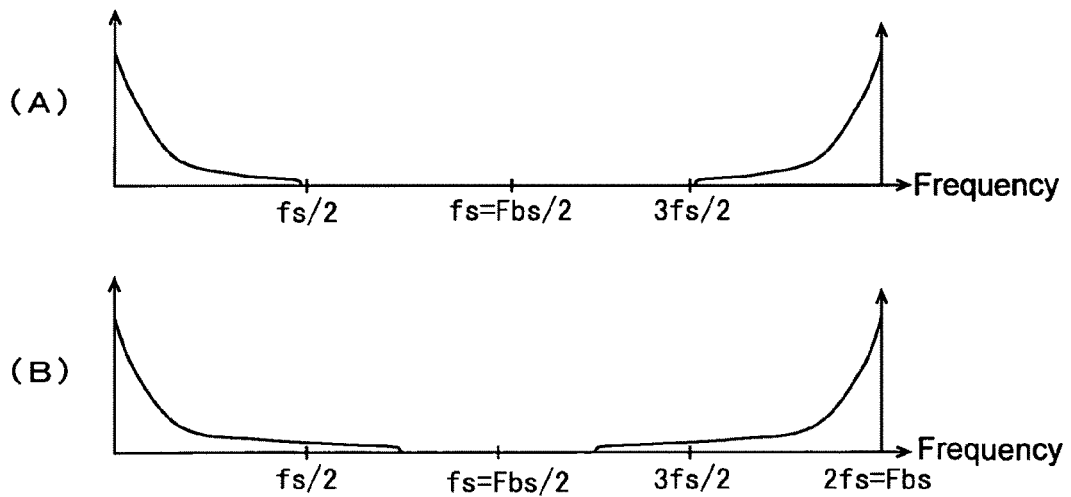
FIG. 8 includes frequency spectrum charts (A and B) for describing an operation of the image enhancing device according to the first embodiment performed to an enlarged image.

On the other hand, if the above-mentioned digital image signal has undergone an image enlarging process for an up-conversion to double the number of pixels in the horizontal direction, a sampling frequency Fbs after the image enlarging process is two times the sampling frequency fs (Fsb=2·fs), and frequency spectra after the image enlarging process are as shown in FIG. 8(A). In this case, there is no frequency component between the Nyquist frequency fs/2 which corresponds to the original sampling frequency fs and the new Nyquist frequency Fbs/2=fs which corresponds to the new sampling frequency Fbs (The same applies to the range between Fbs/2 and 3fs/2). For this reason, performing an enhancement using a conventional image enhancing device to an image signal which has undergone image enlarging processes does not add any high-frequency components to the image signal which has undergone the image enlarging processes. In other words, no frequency components are added near the new Nyquist frequency Fbs/2 (see FIG. 8(A)).

On the contrary, according to the present embodiment, the nonlinear processor 102 includes the square operator 12, which generates high-frequency components including harmonics of the frequency components in the input image signal Sin and having higher frequencies than the Nyquist frequency fs/2. These high-frequency components are then utilized in the sharpening process performed to the input image signal Sin.

In other words, in the case where image enlarging processes are performed to a digital image signal of a sampling frequency fs to generate an image signal of a sampling frequency Fbs=2fs, and the resulting image signal is used as the input image signal Sin, the process based on the square operator 12 generates the second signal S2 as a compensation signal which contains higher-frequency components than the Nyquist frequency fs/2 of the original sampling frequency fs, and this second signal S2 is added to the input image signal Sin. Consequently, the present embodiment generates an output image signal Sout which has frequency spectra as shown in FIG. 8(B). The embodiment provides more appropriate high-frequency compensation to image signals which have undergone enlarging processes than conventional image enhancing devices, making it possible to sufficiently sharpen the images which have undergone enlarging processes.

Hereinafter, more detailed description will be made for the image sharpening process which utilizes harmonic components generated in the nonlinear process as the above. Assume that the input image signal Sin is expressed by a function f(x) which is a function of a (horizontal) position x, and the input image signal Sin has a base angular frequency represented by ω. Then, the function f(x) can be expressed by the following Fourier series:

$$f(x) = a_{-N}\cos(-N)\omega x + a_{-N+1}\cos(-N+1)\omega x \ldots + \qquad (1)$$
$$a_{-1}\cos(-1)\omega x + a_0 + a_1\cos\omega x + a_2\cos2\omega x + \ldots +$$
$$a_N\cos N\omega x + b_{-N}\sin(-N)\omega x + b_{-N+1}\sin(-N+1)\omega x + \ldots +$$
$$b_{-1}\sin(-1)\omega x + b_1\sin\omega x + b_2\sin2\omega x + \ldots + b_N\sin N\omega x$$

where N represents the order of the highest-frequency harmonic not greater than the Nyquist frequency fs/2 of the sampling frequency fs (before image enlarging process). In other words, $$N\omega/(2\pi) < fs/2 \leq (N+1)\omega/(2\pi).$$

From the above expression (1), let g(x) represent non-DC components, i.e. parts other than the DC components $a_0$, of the input signal Sin which is expressed by the function f(x) (hereinafter the input signal will also be called "input signal f(x)"). Then:

$$g(x) = a_{-N}\cos(-N)\omega x + a_{-N+1}\cos(-N+1)\omega x \ldots + \qquad (2)$$
$$a_{-1}\cos(-1)\omega x + a_1\cos\omega x + a_2\cos2\omega x + \ldots + a_N\cos N\omega x +$$
$$b_{-N}\sin(-N)\omega x + b_{-N+1}\sin(-N+1)\omega x + \ldots +$$
$$b_{-1}\sin(-1)\omega x + b_1\sin\omega x + b_2\sin2\omega x + \ldots + b_N\sin N\omega x.$$

The first signal S1 outputted from the HPF 11 contains the above-defined signal g(x) or high-frequency components of the signal g(x). The squared signal S12 outputted from the square operator 12 is a signal obtained by squaring the first signal S1. Then, determining $(g(x))^2$ reveals that each term in $(g(x))^2$ can be expressed by one of the followings based on the expression (2):

$$a_i \cos i\omega x \cdot a_j \cos j\omega x \qquad (3a)$$

$$a_i \cos i\omega x \cdot b_j \sin j\omega x \qquad (3b)$$

$$b_i \sin i\omega x \cdot b_j \sin j\omega x \qquad (3c)$$

$$(i=\pm1, \pm2, \ldots, \pm N; j=\pm1, \pm2, \ldots, \pm N)$$

The expression can be transformed as follows by using trigonometric functional formulae:

$$(a_i a_j/2)\{\cos(i+j)\omega x + \cos(i-j)\omega x\} \quad (4a)$$

$$(a_i b_j/2)\{\sin(i+j)\omega x - \sin(i-j)\omega x\} \quad (4b)$$

$$(-b_i b_j/2)\{\cos(i+j)\omega x - \cos(i-j)\omega x\} \quad (4c)$$

As understood from the above expressions, $(g(x))^2$ contains angular frequency components such as $(N+1)\omega$, $(N+2)\omega$, ..., $2N\omega$, etc., and therefore contains frequency components which have higher frequencies than the Nyquist frequency fs/2. For this reason, the squared signal S12 also contains frequency components which have higher frequencies than the Nyquist frequency fs/2 such as harmonic components of a frequency $2N\omega/(2\pi)$. In cases where the function is raised to the power of an even number such as $(g(x))^2$, terms in the above expressions (4a) and (4c) may have DC components. According to the present embodiment, however, the first differentiator 13 removes these DC components (see FIG. 1).

Hence, when a digital image signal undergoes image enlarging processes such as an up-conversion to double the number of pixels in the horizontal direction as described above, and then the resulting image signal is inputted as the input image signal Sin to the image enhancing device 100 according to the present embodiment, the second signal S2 generated as a compensation signal based on the square operator 12 contains frequency components which have higher frequencies than the Nyquist frequency fs/2 of the image signal before the image enlarging process, and then this second signal S2 is added to the input image signal Sin. As a result, the output image signal Sout has its frequency spectra as shown in FIG. 8(B), and therefore sufficient sharpening becomes possible to images which have undergone enlarging processes as compared to conventional image enhancing devices. Also, the images are sharpened by an addition of frequency components which have higher frequencies not contained in the input image signal Sin, i.e., frequency components which have higher frequencies than the original Nyquist frequency fs/2. In this regard it can be stated that the present embodiment provides a technique for enhancing a resolution of images represented by the input image signal Sin. It should be understood from the above-described mathematical expressions (see expressions (1) through (4c)), that the principal requirement to the first signal S1 which is to be inputted to the nonlinear processor 102 is simply that it is a signal obtained from the input image signal Sin by removing DC components. Therefore, the HPF 11 may be replaced by a filter of other types which is capable of removing at least DC components from the frequency components contained in the input image signal Sin.

1.3 Advantages

As has been described above, in the present embodiment, high-frequency components are extracted as the first signal S1 from the input image signal Sin by the HPF 11, then, this signal is processed by the square operator 12 into the squared signal S12, and based on this squared signal S12 the second signal S2 is generated in which the positive and negative signs in the first signal S1 are preserved, and thereafter this signal is added as a compensation signal to the input image signal Sin. As a result, the image is sufficiently sharpened, and it is now possible to improve quality of the image more remarkably than by the conventional image enhancing devices. Also, the image enhancing device 100 according to the present embodiment can be implemented by a simple arrangement as shown in FIG. 1 through FIG. 4. Therefore, by using the image enhancing device 100 in high definition television (HDTV) receivers, standard definition television (SDTV) receivers, etc., it is now possible to improve the quality of image not only for still images but also for moving images which are displayed in real time, without a large cost increase. It should be noted here that although the square operator 12 and the multiplier 15 in the nonlinear processor 102 according to the present embodiment may be implemented as hardware multipliers, the square operator 12 and the multiplier 15 may alternatively be implemented in the form of a ROM (Read Only Memory) table since the number of bits of the input image signal Sin, etc. is not large (For example, eight-bit signals are required for images having 256 tones). Implementation by using a ROM table as described above enables high speed processing and is advantageous when displaying moving images in real time.

The present embodiment is capable of compensating a high-frequency range beyond the Nyquist frequency fs/2 which has not been possible by the conventional image enhancing devices. Thus, the present embodiment is especially advantageous for improving the quality of image through a sharpening process performed to image signals which have undergone enlarging processes. An example is a case where standard definition television (SDTV) image signals undergo enlarging processes so that their images may be displayed in a display device of a high definition television (HDTV) receiver. In this case, the present embodiment provides a remarkable advantage in that sufficient sharpening is possible with a simple arrangement, to the moving images which are displayed in real time. Another example is a current technical development for new display devices which use larger numbers, perhaps in the order of 4000×2000, of pixels than HDTV (hereinafter will be called "4 k display device") and television broadcasting technology therefor. When HDTV image signals are up-converted for display in these 4 k display devices, the present embodiment provides the same remarkable advantage as described above.

1.4 Variations of First Embodiment

Figure 9:
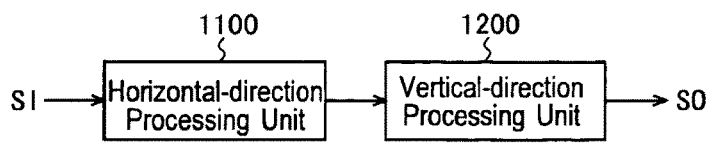
FIG. 9 is a block diagram for describing a first variation of the first embodiment.

Thus far, description was made on a basis that the input image signal Sin was made of a data string (a series of pixel values) which represented horizontal rows of pixels in the image as an object of processing by the image enhancing device 100 according to the present embodiment. Based on this, description was made on how the HPF 11, the first and the second differentiators 13, 14 would perform their filtering or differentiating operations on the horizontal frequencies to change pixel values in the horizontal direction in the image. Namely, in the embodiment described above, an image enhancement process was made for the horizontal direction in the image. Preferably, however, vertical image enhancement should also be performed in addition to horizontal image enhancement. For this reason, it is preferable as shown in FIG. 9, that the image enhancing device has a horizontal-direction processing unit 1100 for horizontal image enhancement, and a vertical-direction processing unit 1200 for vertical image enhancement. In this arrangement, an input image signal SI which represents an image and is an object of the process is inputted to the horizontal-direction processing unit 1100, then an output from the horizontal-direction processing unit 1100 is inputted to the vertical-direction processing unit 1200, and an output signal from the vertical-direction processing unit 1200 is an output image signal SO from the image enhancing device. As a note for this arrangement, the horizontal-direction processing unit 1100 and the vertical-direction processing unit 1200 may be swapped each other in their sequential relationship so that the input image signal SI will first be inputted to the vertical-direction processing unit 1200 and then an output signal from the vertical-direction processing unit 1200 will be inputted to the horizontal-direction processing unit 1100.

Figure 10:
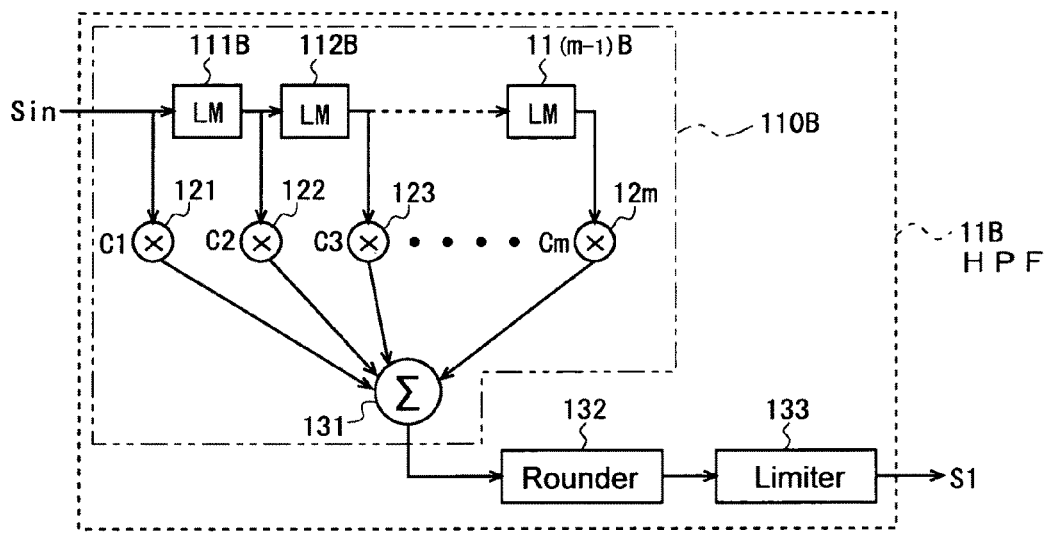
FIG. 10 is a block diagram showing a configuration of a high pass filter used in a vertical-direction processing unit according to the first variation.
Figure 11:
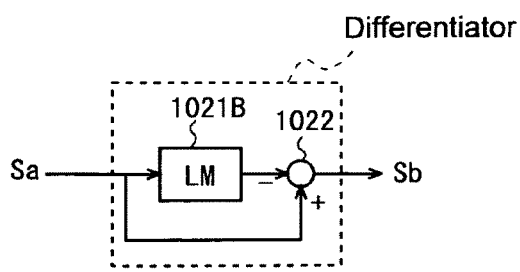
FIG. 11 is a block diagram showing a configuration of a differentiator used in the vertical-direction processing unit according to the first variation.

The vertical-direction processing unit 1200 in the arrangement described above can be implemented using the same arrangement (FIG. 1 through FIG. 4) if the input image signal SI is made of a data string (a series of pixel values) which represents a vertical row of pixels in the image as an object of processing. Alternatively, the variation may use the same input image signal SI as in the above-described embodiment (i.e. input image signal SI is made of a data string which represents a horizontal row of pixels), with an HPF 11 arranged as in FIG. 10, and a first and a second differentiators 13, 14 arranged as in FIG. 11. While the arrangement in FIG. 2 works on spatial frequency components in the horizontal direction in the image to extract high-frequency components (to remove at least DC components), the arrangement in FIG. 10 works on spatial frequency components in the vertical direction in the image to extract high-frequency components (to remove at least DC components). For this purpose, the arrangement in FIG. 10 uses line memories (LM) 111B through 11 (m−1) B as delay elements for one horizontal period, in place of the unit-delay elements 111 through 11m in the arrangement in FIG. 2 respectively. Other than this, the arrangement in FIG. 10 is identical with the arrangement in FIG. 2, and therefore no repetitive description will be given hereafter while the same parts and components are identified with the same reference symbols. Likewise, the arrangement in FIG. 11 is identical with the one in FIG. 4, differing only in that the unit-delay elements 1021 in FIG. 4 are replaced by line memories (LM) 1021B as delay elements for one horizontal period. Therefore no repetitive description will be given hereafter while the same parts and component are identified with the same reference symbols. Whereas the first differentiator 13 according to the arrangement in FIG. 4 works on spatial frequencies in the horizontal direction of the image so that the DC components therein will not be contained in the second signal S2, the first differentiator 13 in FIG. 11 works on spatial frequencies in the vertical direction of the image so that the DC components therein will not be contained in the second signal S2.

Figure 12:
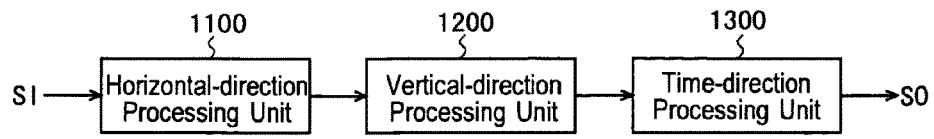
FIG. 12 is a block diagram for describing a second variation of the first embodiment.
Figure 13:
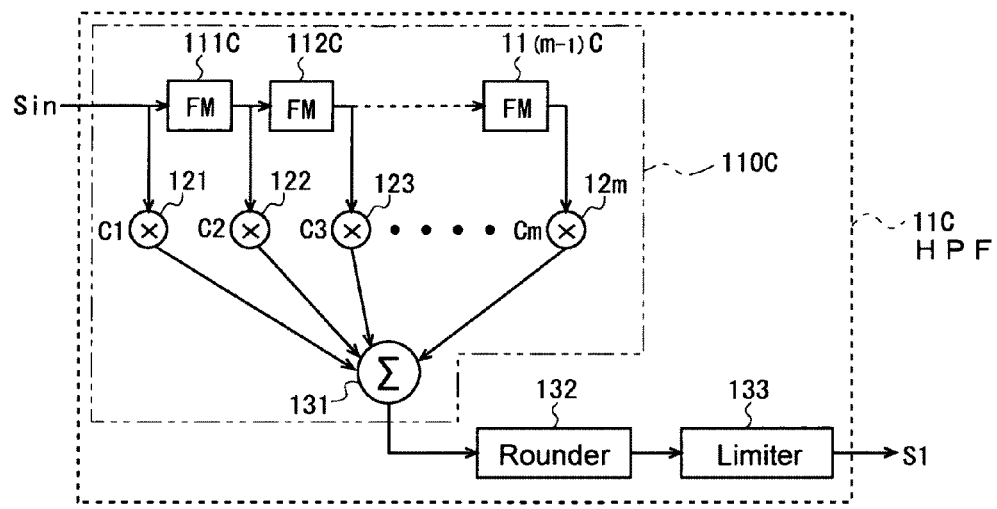
FIG. 13 is a block diagram showing a configuration of a high pass filter used in a time-direction processing unit according to the second variation.
Figure 14:
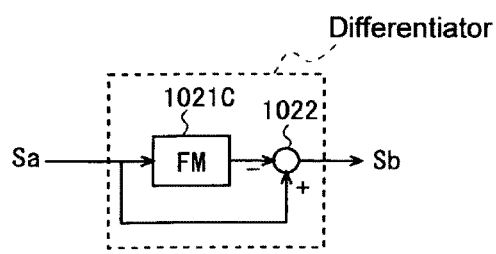
FIG. 14 is a block diagram showing a configuration of a differentiator used in the time-direction processing unit according to the second variation.

Also, in cases where the object of processing is a moving image such as displayed in television receivers, each pixel value changes with time, so it is preferable to provide a time-direction processing unit 1300 for image enhancement in the direction of time. Specifically, as shown in FIG. 12, an image enhancing device includes the time-direction processing unit 1300 in addition to the horizontal-direction processing unit 1100 and the vertical-direction processing unit 1200 described above. In this case, the time-direction processing unit 1300 can be implemented by the same configuration according to the above-described embodiment using, however, the arrangement in FIG. 13 for the HPF 11, and the arrangement in FIG. 14 for the first and the second differentiators 13, 14, and using the same input image signal SI as in the embodiment described earlier. The arrangement in FIG. 13 is identical with the one in FIG. 2, differing only in that the unit-delay elements 111 through 11m in FIG. 2 are replaced by frame memories (FM) 111C through 11(m−1)C as delay elements for one frame period, and therefore no repetitive description will be given hereafter while the same parts and components are identified with the same reference symbols. Likewise, the arrangement in FIG. 14 is identical with the one in FIG. 4, differing only in that the unit-delay elements 1021 in FIG. 4 are replaced by frame memories (FM) 1021C as delay elements for one frame period, and therefore no repetitive description will be given hereafter while the same parts and components are identified with the same reference symbols. Whereas the HPF 11C in FIG. 13 extracts high-frequency components (removes at least DC components) in time-direction frequency components of the image, the first differentiator 13 in FIG. 14 works on the time-direction frequencies of the image so that the DC components therein will not be contained in the second signal S2.

It should be noted here that the present embodiment uses a square operator 12 in order to perform a nonlinear processing to the first signal S1. Alternatively, the square operator 12 may be replaced by a fourth-power operator which raises the first signal S1 to the fourth power. In a more general sense, the square operator may be replaced by a power operator which generates a signal that is equivalent to the first signal S1 raised to a predetermined power whose exponent is two or a greater even number. Also, there may be arrangements where one or both of the first differentiator 13 and the second differentiator 14 in the present embodiment are replaced by high pass filters (HPFs). In general, a differentiator may be regarded as a type of high pass filters.

2. Second Embodiment

Figure 15:
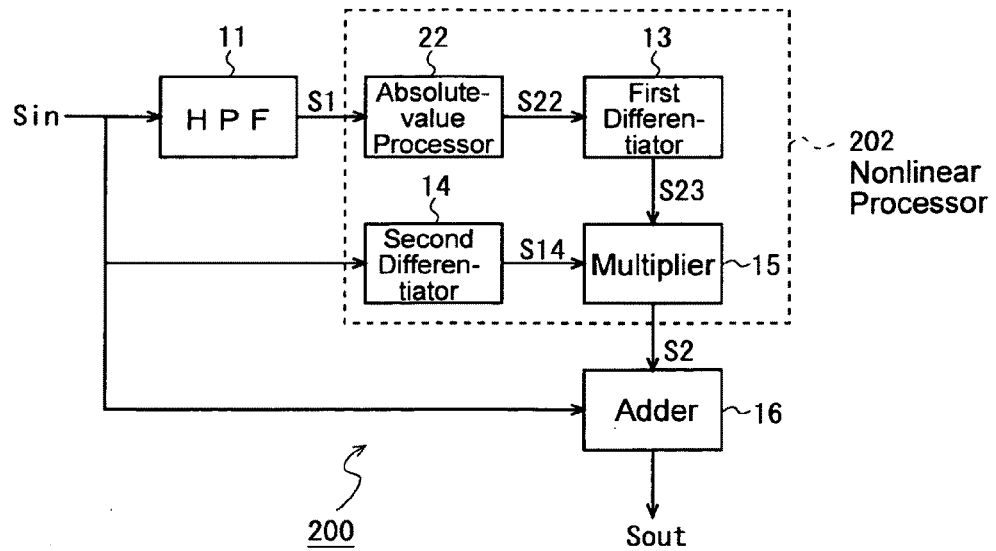
FIG. 15 is a block diagram showing a configuration of an image enhancing device according to a second embodiment of the present invention.

FIG. 15 is a block diagram showing a configuration of an image enhancing device according to a second embodiment of the present invention. This image enhancing device 200 performs, to an input image signal Sin which is inputted as a digital signal that represents an image, an image enhancement for sharpening the image represented by the input image signal Sin; and includes a HPF 11, a nonlinear processor 202, and an adder 16. The nonlinear processor 202 includes an absolute-value processor 22 in place of the square operator 12 in the first embodiment. All the other aspects of the present embodiment are identical with those in the first embodiment (FIG. 1 through FIG. 4), so the same parts and components are identified with the same reference symbols, and detailed description will not be given hereafter.

In the present embodiment, the HPF 11 outputs a first signal S1, which is then inputted to the absolute-value processor 22 in the nonlinear processor 202. The absolute-value processor 22 generates an absolute-value signal S22 as a signal which represents an absolute value of the first signal S1. Specifically, where the first signal S1 is made of a data string X1, X2, X3, . . . , the absolute-value signal S22 is a digital signal made of a data string ≡|X1|, |X2|, |X3|, . . . . This absolute-value signal S22 is inputted to the first differentiator 13. The differentiator 13 differentiates the absolute-value signal S22 and thereby generates a first differentiation signal S23. The first differentiation signal S23 is inputted to the multiplier 15.

On the other hand, the second differentiator 14 in the nonlinear processor 202 differentiates the input image signal Sin and thereby generates a second differentiation signal S14. The second differentiation signal S14 is also inputted to the multiplier 15.

The multiplier 15 multiplies the first differentiation signal S23 by the second differentiation signal S14 and thereby generates a second signal S2. The second signal S2 is outputted from the nonlinear processor 102 and then inputted to the adder 16.

The adder 16 adds the second signal S2 as an image-sharpening compensation signal to the input image signal Sin and thereby generates an output image signal Sout.

Next, description will cover an operation of the image enhancing device 200 according to the present embodiment arranged as the above. The description will focus on a process to be performed to a portion of the input image signal Sin as shown in FIG. 6(A), which represents an edge where the level (pixel value) of the image signal changes in the horizontal direction.

The present embodiment performs basically the same operation as the first embodiment. Specifically, when an input image signal Sin as shown in FIG. 6(A) and representing an edge is inputted to the image enhancing device 200 according to the present embodiment, a signal as shown in FIG. 5(C) is generated as a first signal S1. In the present embodiment, the first signal S1 is inputted to the absolute-value processor in the nonlinear processor 102. The absolute-value processor 22 generates, from the first signal S1 as shown in FIG. 5(C), an absolute-value signal S22 which is similar to the signal S12 in FIG. 6(B). Specifically, where the first signal S1 is made of a data string given by X1, X2, X3, . . . , the absolute-value processor 22 generates a digital signal which is made of a data string given by |X1|, |X2|, |X3|, . . . , as the absolute-value signal S22. On the other hand, the squared signal S12 is a digital signal which is made of a data string given by $X1^2$, $X2^2$, $X3^2$, . . . . Therefore, the squared signal S12 and the absolute-value signal S22 have similar overall signal waveforms to each other as a whole although they are different from each other in the signal level (FIG. 6(B)).

Thus, from the absolute-value signal S22 as described above, the first differentiator 13 generates a differentiation signal S23 which is similar to the first differentiation signal S13 shown in FIG. 6(C), and the process of differentiating the absolute value S22 eliminates DC components.

Meanwhile, from the input image signal Sin, the second differentiator 14 generates a second differentiation signal S14 as shown in FIG. 6(D). From this second differentiation signal S14 and the above-described first differentiation signal S23, the multiplier 15 generates a second signal S2 as shown in FIG. 6(E). The second signal S2 is added as a compensation signal to the input image signal Sin by the adder 16, to generate an output image signal Sout as shown in FIG. 6(F). This output image signal Sout has an edge portion which rises more sharply than the edge portion (FIG. 5(D)) of the image output signal generated by the conventional image enhancing device.

As understood from the above description, the second signal S2 outputted as a compensation signal from the nonlinear processor 102 which includes the absolute-value processor 22 is obtained by performing a nonlinear processing to the first signal S1 (FIG. 5(C)) which is outputted from the HPF 11 as a high-frequency signal. Also, the second signal S2 does not contain DC components since they are removed by the first differentiator 13. Further, the second differentiation signal S14 obtained by the second differentiator 14 is multiplied by the first differentiation signal S23, whereby the positive and negative signs in the first signal (FIG. 5(C)) are substantially preserved in the second signal S2 (FIG. 6(E)). Based on nonlinearity of the process performed to the first signal S1, and preservation of the positive and negative signs which are found in the first signal S1, the output image signal Sout has an edge portion which rises more sharply (FIG. 6(F)) than the edge portion (FIG. 5(D)) in the image output signal from the conventional image enhancing device, providing a sharper image than conventionally enhanced images.

In the present embodiment, the nonlinear characteristic of the process performed to the first signal S1 is based on the absolute-value processor 22. By processing the first signal S1, the absolute-value processor 22 generates frequency components which have higher frequencies than the Nyquist frequency fs/2 of the input image signal Sin. Specifically, when an absolute value |sin x| of a trigonometric function sin x is expanded into a Fourier series, there appears a term which contains cos (2πx) and other terms corresponding to frequency components which have frequencies two or greater times the x. This means that the absolute-value signal S22 generated by the absolute-value processor 22 contains harmonics of the first signal S1 including high-frequency components of the input image signal Sin. Therefore, the second signal S2 which is added to the input image signal Sin as a compensation signal contains high-frequency components of higher frequencies than the Nyquist frequency fs/2.

Hence, the present embodiment, like the first embodiment, provides greater quality improvement of images than conventional image enhancing devices which are based on linear processing. Since it is possible to provide sufficient sharpening of images with a simple arrangement as shown in FIG. 15, it is now possible to improve the quality of image not only for still images but also for moving images which are displayed in real time, without a large cost increase. Further, in cases where the input image signal Sin is provided by an image signal which has undergone image enlarging processes, the present embodiment provides remarkable improvement in the quality of image by accomplishing sufficient sharpening of the image which has already undergone the enlarging processes as compared to conventional image enhancing devices which are not capable of compensating high-frequency ranges beyond the Nyquist frequency fs/2.

As in the first embodiment, it is preferable in the present embodiment, too, that image enhancement in vertical direction is performed in addition to the image enhancement in horizontal direction, to the image. For this purpose, it is preferable that as shown in FIG. 9, the image enhancing device 200 includes a horizontal-direction processing unit 1100 for image enhancement in horizontal direction, and a vertical-direction processing unit 1200 for image enhancement in vertical direction (see FIG. 9 through FIG. 11). This also applies to the other embodiments which are to be described later. Also, in cases where the object of processing is a moving image such as moving images displayed in television receivers, each pixel value changes with time, so it is preferable to provide a time-direction processing unit 1300 for image enhancement in the direction of time. Specifically, as shown in FIG. 12, an image enhancing device 200 includes the time-direction processing unit 1300 in addition to the horizontal-direction processing unit 1100 and the vertical-direction processing unit 1200 described above (see FIG. 12 through FIG. 14). This also applies to the other embodiments which are to be described later.

3. Third Embodiment

Figure 16:
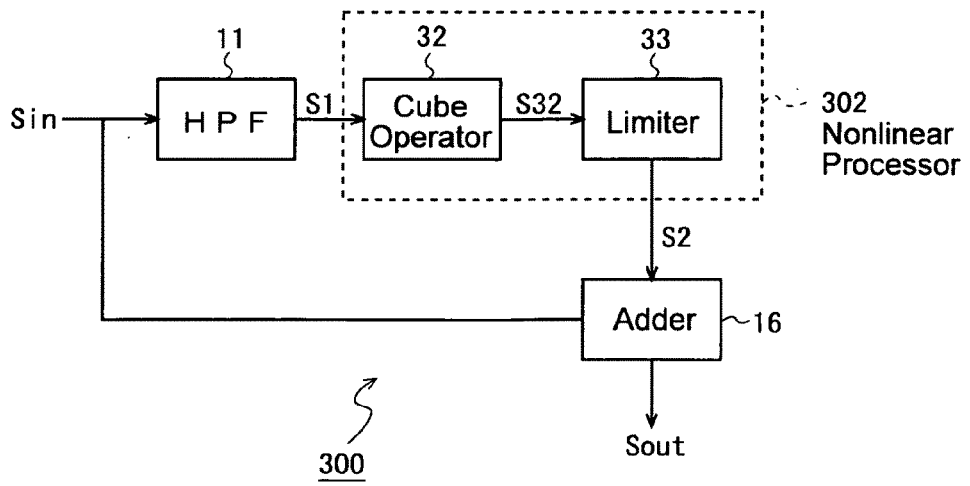
FIG. 16 is a block diagram showing a configuration of an image enhancing device according to a third embodiment of the present invention.

FIG. 16 is a block diagram showing a configuration of an image enhancing device according to a third embodiment of the present invention. This image enhancing device 300 performs an image enhancement for sharpening an image represented by an input image signal Sin which is inputted externally as a digital signal; and includes an HPF 11, a nonlinear processor 302, and an adder 16. The nonlinear processor 302 includes a cube operator 32 and a limiter 33. All the other aspects of the present embodiment than the nonlinear processor 302 are identical with those in the first embodiment (FIG. 1 through FIG. 4), so the same parts and components are identified with the same reference symbols, with no detailed description to be given hereafter.

In the present embodiment, the HPF 11 outputs a first signal S1, which is then inputted to the cube operator 32 in the nonlinear processor 302. The cube operator 32 cubes the first signal S1 and thereby generates a cubed signal S32; namely, S32=S1$^3$. More specifically, since the first signal S1 is a digital signal (discrete signal), the first signal S1 can be expressed as a data string X1, X2, X3, . . . . Then, the cubed signal S32 is expressed as a digital signal which is made of a data string X1$^3$, X2$^3$, X3$^3$, . . . . The cubed signal S32 is inputted to the limiter 33.

The limiter 33 functions as an amplitude (signal level) adjuster of the cubed signal S32. Specifically, the adjuster multiples the cubed signal S32 by a constant α which satisfies $0 \leq \alpha \leq 1$, thereby performing a gain control on the signal, and then performs clipping so that the cubed signal S32 which has undergone the gain control has an amplitude which is not greater than a predetermined upper limit value. For example, when the signal value of the cubed signal S32 as after the gain control is greater than 32, the limiter 33 changes the value to positive or negative 32 depending on the sign. The output signal from the limiter 33 is outputted as the second signal S2 from the nonlinear processor 302, and inputted to the adder 16.

The adder 16 adds the second signal S2 as an image-sharpening compensation signal to the input image signal Sin and thereby generates an output image signal Sout.

Next, description will cover an operation of the image enhancing device 300 according to the present embodiment which is arranged as the above. The description will focus on a process to be performed to a portion of the input image signal Sin as shown in FIG. 17(A), which represents an edge where the level (pixel value) of the image signal changes in the horizontal direction.

Figure 17:
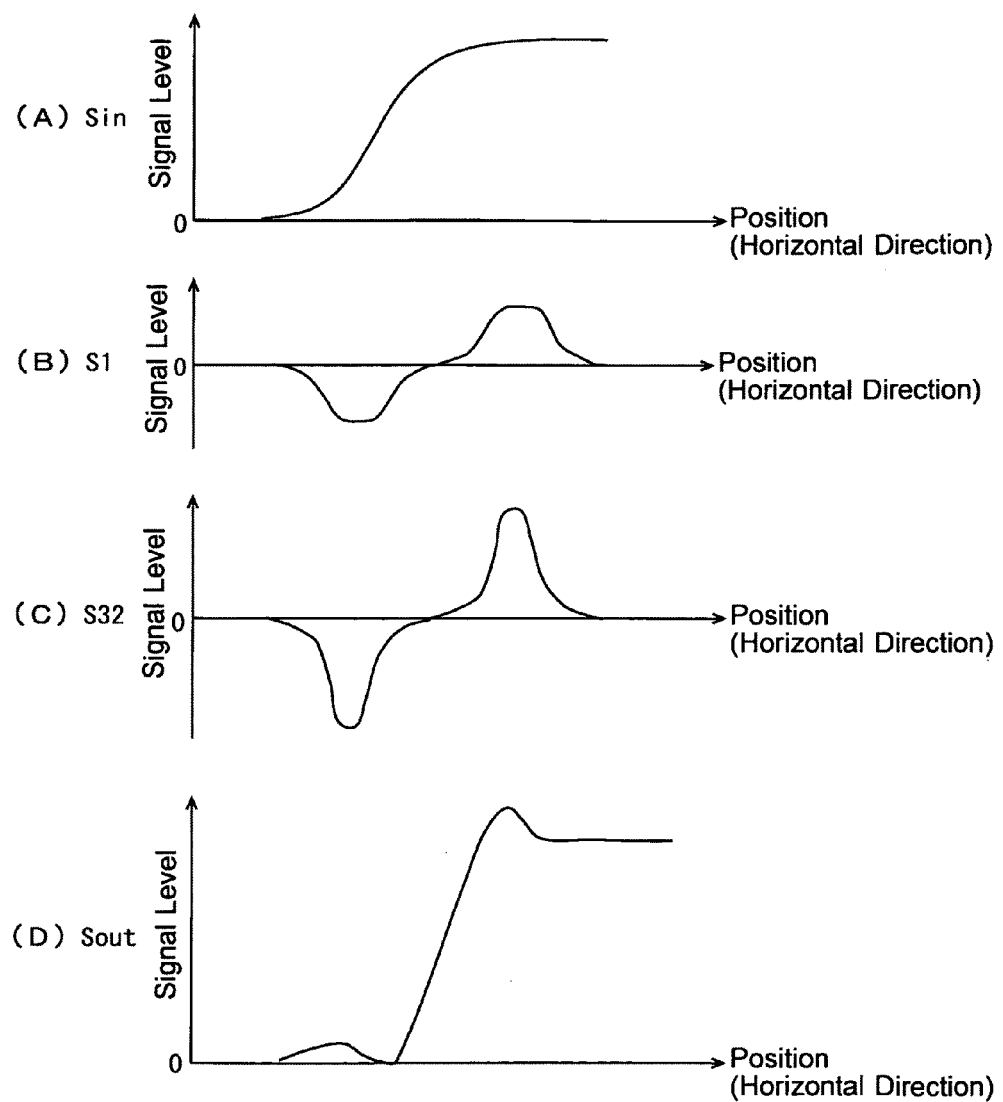
FIG. 17 includes signal waveform charts (A through D) for describing an operation of the image enhancing device according to the third embodiment.

When an input image signal Sin as shown in FIG. 17(A) which represents an edge is inputted to the image enhancing device 300 according to the present embodiment, a signal as shown in FIG. 17(B) is generated as a first signal S1. In the present embodiment, the first signal S1 is inputted to the cube operator 32 in the nonlinear processor 102. The cube operator 32 generates, from the first signal S1, a cubed signal S32 as shown in FIG. 17(C). Specifically, the first signal S1 can be expressed as a data string X1, X2, X3, . . . . Then, cubed signal S32 is expressed as a digital signal which is made of a data string X1$^3$, X2$^3$, X3$^3$, . . . . Therefore, the positive and negative signs in the first signal S1 are preserved in the cubed signal S32.

The cubed signal S32 as described above receives the gain control and clipping adjustment for an adjusted amplitude, and then is outputted as a second signal S2 from the nonlinear processor 302. The second signal S2 is added as a compensation signal to the input image signal Sin by the adder 16, whereby an output image signal Sout as shown in FIG. 17(D) is generated. The output image signal Sout has an edge portion which rises more sharply than the conventional edge portion (FIG. 5(D)) of the image output signal generated by the conventional image enhancing device.

As understood from the above description, the second signal S2 which is added to the input image signal Sin as a compensation signal is obtained by performing a nonlinear processing to the first signal S1 (FIG. 17(B)) which is outputted from the HPF 11 as a high-frequency signal. In other words, the second signal S2 is generated from the first signal S1 by the cube operator 32, and differing from the nonlinear processing based on the square operator 12, the positive and negative signs in the first signal S1 are preserved in the second signal S2. Based on nonlinearity of the process performed to the first signal S1, and preservation of the positive and negative signs which are found in the first signal S1, the present embodiment provides the output image signal Sout in which an edge portion rises more sharply (FIG. 17(D)) than the conventional edge portion (FIG. 5(D)) in the image output signal from the conventional image enhancing device, and therefore provides sharper images than conventionally enhanced images.

In the present embodiment, the nonlinear characteristic of the process performed to the first signal S1 is based on the cube operator 32. Namely, in the present embodiment, like in the first embodiment, the first signal S1 outputted from the HPF 11 contains the signal g(x) or high-frequency components of the signal g(x) given by the expression (2) described earlier, and the cubed signal S32 outputted from the cube operator 32 is a signal obtained by cubing the first signal S1. Then, determining the function $(g(x))^3$ from the expression (2) reveals that each term in $(g(x))^3$ can be expressed by one of the following expressions:

$$a_i \cos i\omega x \cdot a_j \cos j\omega x \cdot a_k \cos k\omega x \quad (5a)$$

$$a_i \cos i\omega x \cdot a_j \cos j\omega x \cdot b_k \sin k\omega x \quad (5b)$$

$$a_i \cos i\omega x \cdot b_j \sin j\omega x \cdot b_k \sin k\omega x \quad (5c)$$

$$b_i \sin i\omega x \cdot b_j \sin j\omega x \cdot b_k \sin k\omega x \quad (5d)$$

(i=±1, ±2, . . . , ±N; j=±1, ±2, . . . , ±N; k=±1, ±2, . . . , ±N).

Now, from the terms for i=j=k=N, take, for example, the following terms which are expressed by the expressions (5a) and (5d). From trigonometric function formulae, these terms can be transformed to the followings:

$$(a_N \cos N\omega x)^3 = a_N^3\{(3/4)\cos N\omega x + (1/4)\cos 3N\omega x\} \quad (6a)$$

$$(b_N \sin N\omega x)^3 = b_N^3\{(3/4)\sin N\omega x - (1/4)\sin 3N\omega x\} \quad (6d)$$

Also, in the terms for i=j=k=−N, take the following terms which are expressed by the expressions (5a) and (5d). From trigonometric function formulae, these terms can be transformed to the followings:

$$\{a_N \cos(-N\omega x)\}^3 = a_N^3\{(3/4)\cos(-N\omega x) + (1/4)\cos(-3N\omega x)\} \quad (7a)$$

$$\{b_N \sin(-N\omega x)\}^3 = b_N^3\{(3/4)\sin(-N\omega x) - (1/4)\sin(-3N\omega x)\} \quad (7d)$$

From the expressions (6a), (6d), (7a) and (7d), it is understood that $(g(x))^3$ contains a frequency component which has 3N times the base angular frequency ω, and a frequency component which has −3N times thereof. The other terms in $(g(x))^3$ can also be transformed by using trigonometric function formulae, which will then reveal that $(g(x))^3$ contains various frequency components ranging from −3N times to 3N times the base angular frequency ω.

Consequently, $(g(x))^3$ includes high-frequency components which have frequencies up to three times the frequencies of the frequency components included in the first signal S1. This means that the cubed signal S32 contains frequency components which have sufficiently higher frequencies than the Nyquist frequency fs/2, such as frequency components having frequencies up to three times the frequencies of the frequency components included in the first signal S1. Therefore, according to the present embodiment, greater quality improvement of the image is possible than conventional image enhancing device based on linear processing. Also, since it is possible to provide sufficient sharpening of images with a simple arrangement as shown in FIG. 16, it is now possible to improve the quality of image not only for still images but also for moving images which are displayed in real time, without a large cost increase. Further, in cases where the input image signal is provided by an image signal which has undergone image enlarging processes, the present embodiment provides remarkable improvement in the quality of image by accomplishing sufficient sharpening of the image which has already undergone the enlarging processes as compared to conventional image enhancing devices which are not capable of compensating high-frequency ranges beyond the Nyquist frequency fs/2.

It should be noted here that the present embodiment uses a cube operator 32 in order to perform a nonlinear processing to the first signal S1. Alternatively, the cube operator 32 may be replaced by a fifth-power operator which raises the first signal S1 to the fifth power. In a more general sense, the cube operator may be replaced by a power operator which generates a signal that is equivalent to the first signal S1 raised to a predetermined power whose exponent is three or a greater odd number.

4. Fourth Embodiment

Figure 18:
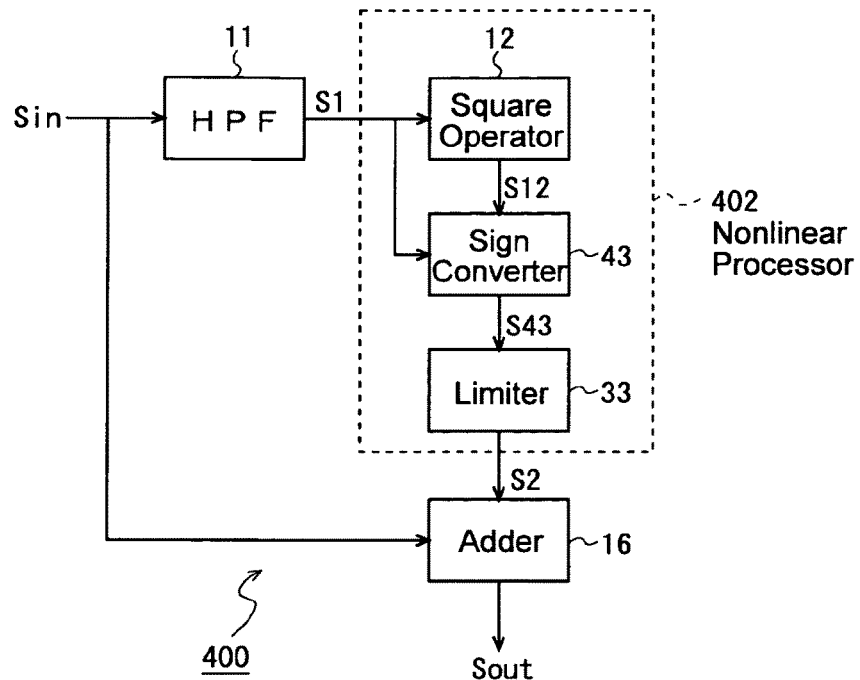
FIG. 18 is a block diagram showing a configuration of an image enhancing device according to a fourth embodiment of the present invention.

FIG. 18 is a block diagram showing a configuration of an image enhancing device according to a fourth embodiment of the present invention. This image enhancing device 400 performs an image enhancement for sharpening an image represented by an input image signal Sin which is inputted externally as a digital signal; and includes a HPF 11, a nonlinear processor 402, and an adder 16. The nonlinear processor 402 includes a square operator 12, a sign converter 43 and a limiter 33. All the other aspects of the present embodiment than the nonlinear processor 402 are identical with those in the first embodiment (FIG. 1 through FIG. 4). Also, the square operator 12 and the limiter 33 in the nonlinear processor 402 are identical with the square operator 12 in the first embodiment and the limiter 33 in the third embodiment respectively. Those same parts and components in the present embodiment which are identical with those in the first or the third embodiment are identified with the same reference symbols, with no detailed description to be given hereafter.

In the present embodiment, the HPF 11 outputs a first signal S1, which is then inputted to the square operator 12 in the nonlinear processor 402. The square operator 12 squares the first signal S1 and thereby generates a squared signal S12. The squared signal S12 is inputted to the sign converter 43. The first signal S1 is also inputted to the sign converter 43.

The sign converter 43 performs a sign conversion process of restoring signs in the squared signal S12 by matching them with corresponding ones in the first signal S1 based on sign-bit information contained in the first signal S1 outputted from the HPF 11. Specifically, the sign converter 43 leaves positive and negative signs in the squared signal S12 intact if they are identical with their respective counterparts in the first signal S1, but reverses these signs in the squared signal S12 if they are different from their respective counterparts in the first signal S1. The signal which is obtained from the sign converter 43 is inputted to the limiter 33 as a sign conversion signal S43. Like the limiter 33 in the third embodiment, the limiter 33 in the present embodiment makes an adjustment on the amplitude of the sign conversion signal S43, and then the adjusted signal is outputted as the second signal S2 from the nonlinear processor 402. The second signal S2 is then inputted to the adder 16 as a compensation signal.

The adder 16 adds the second signal S2 as an image-sharpening compensation signal to the input image signal Sin and thereby generates an output image signal Sout.

Next, description will cover an operation of the image enhancing device 400 according to the present embodiment as arranged as the above. The description will focus on a process to be performed to a portion of the input image signal Sin as shown in FIG. 20(A), which represents an edge where the level (pixel value) of the image signal changes in the horizontal direction.

Figure 20:
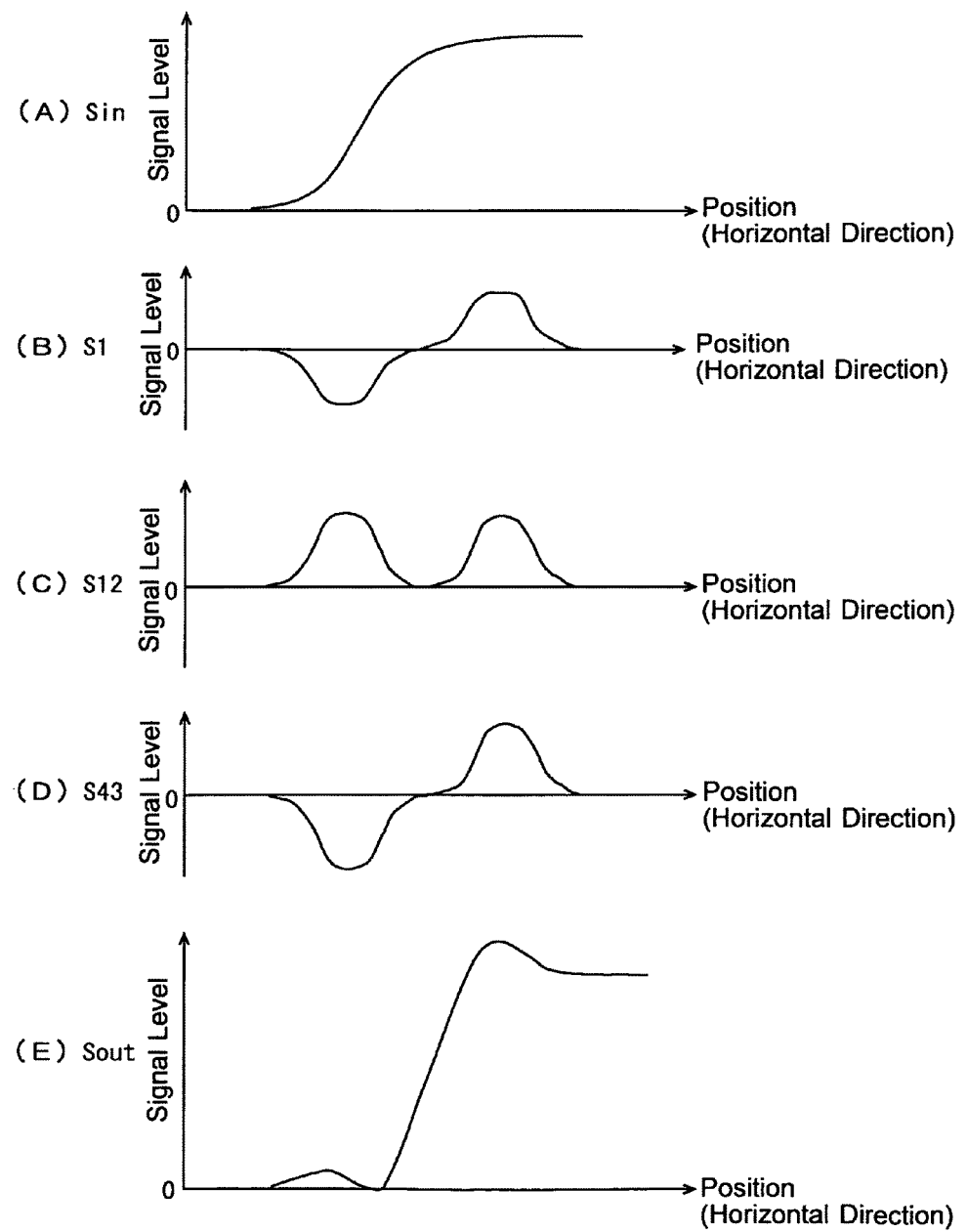
FIG. 20 includes signal waveform charts (A through E) for describing an operation of the image enhancing device according to the fourth embodiment.

When an input image signal Sin as shown in FIG. 20(A) which represents an edge is inputted to the image enhancing device 400 according to the present embodiment, a signal as shown in FIG. 20(B) is generated as a first signal S1. In the present embodiment, the first signal S1 is inputted to the square operator 12 in the nonlinear processor 402. The square operator 12 generates a squared signal S12 as shown in FIG. 20(C) from the first signal S1.

The squared signal S12 is converted into a sign conversion signal S43 as shown in FIG. 20(D) by the sign converter 43. In the sign conversion signal S43, the positive and negative signs in the first signal S1 are preserved. Also, the sign conversion signal S43 does not contain DC components (FIG. 20(D)) since it is a signal obtained by first squaring the first signal S1 (FIG. 20(C)) which does not contain DC components and then performing the sign conversion process.

The sign conversion signal S43 as described above receives an amplitude adjustment in the limiter 33, and then is outputted as a second signal S2 from the nonlinear processor 302. The second signal S2 is added as a compensation signal to the input image signal Sin by the adder 16, whereby an output image signal Sout as shown in FIG. 20(E) is generated. The output image signal Sout has an edge portion which rises more sharply than the conventional edge portion (FIG. 5(D)) of the image output signal generated by the conventional image enhancing device.

As understood from the above description, the second signal S2 which is added to the input image signal Sin as a compensation signal is obtained by performing a nonlinear processing to the first signal S1 (FIG. 20(B)) which is outputted from the HPF 11 as a high-frequency signal. In other words, the second signal S2 is generated from the first signal S1 by the square operator 12, and the positive and negative signs in the first signal S1 are preserved in the second signal S2 by the sign converter 43. Based on nonlinearity of the process performed to the first signal S1, and preservation of the positive and negative signs which are found in the first signal S1, the present embodiment provides the output image signal Sout in which an edge portion rises more sharply (FIG. 20(E)) than the conventional edge portion (FIG. 5(D)) in the image output signal from the conventional image enhancing device, and therefore provides sharper images than conventionally enhanced images.

Also, based on the process performed by the square operator 12, the second signal S2 contains frequency components which have higher frequencies than a Nyquist frequency fs/2 which is the Nyquist frequency of the sampling frequency fs of the input image signal Sin. Therefore, the present embodiment provides greater quality improvement of images than conventional image enhancing devices which are based on linear processing. Since it is possible to provide sufficient sharpening of images with a simple arrangement as shown in FIG. 18, it is now possible to improve the quality of image not only for still images but also for moving images which are displayed in real time, without a large cost increase. Further, in cases where the input image signal is provided by an image signal which has undergone image enlarging processes, the present embodiment provides remarkable improvement in the quality of image by accomplishing sufficient sharpening of the image which has already undergone the enlarging processes as compared to conventional image enhancing devices which are not capable of compensating high-frequency ranges beyond the Nyquist frequency fs/2.

It should be noted here that the present embodiment uses a square operator 12 in order to perform a nonlinear processing to the first signal S1. Alternatively, the square operator 12 may be replaced by a fourth-power operator which raises the first signal S1 to the fourth power. In a more general sense, the square operator may be replaced by a power operator which generates a signal that is equivalent to the first signal S1 raised to a predetermined power whose exponent is two or a greater even number.

5. Fifth Embodiment

Figure 19:
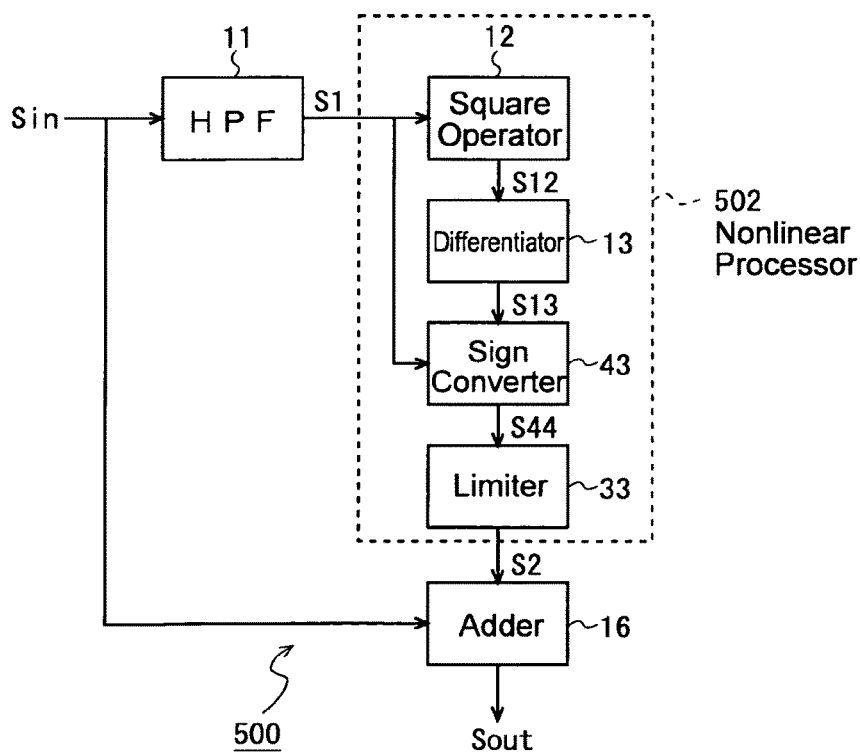
FIG. 19 is a block diagram showing a configuration of an image enhancing device according to a fifth embodiment of the present invention.

FIG. 19 is a block diagram showing a configuration of an image enhancing device according to a fifth embodiment of the present invention. This image enhancing device 500 performs an image enhancement for sharpening an image represented by an input image signal Sin which is inputted externally as a digital signal; and includes a HPF 11, a nonlinear processor 502, and an adder 16. The nonlinear processor 502 includes a square operator 12, a differentiator 13, a sign converter 43 and a limiter 33. All the aspects of the present embodiment other than the nonlinear processor 502 are identical with those in the first embodiment (FIG. 1 through FIG. 4). Also, the square operator 12 and the differentiator 13 in the nonlinear processor 502 are identical with the square operator 12 and the first differentiator 13 in the first embodiment, while the limiter 33 in the nonlinear processor 502 is identical with the limiter 33 in the third embodiment. Those same parts and components in the present embodiment which are identical with those in the first or the third embodiment are identified with the same reference symbols, with no detailed description to be given hereafter.

In the present embodiment, the HPF 11 outputs a first signal S1, which is then inputted to the square operator 12 in the nonlinear processor 502. The square operator 12 squares the first signal S1 and thereby generates a squared signal S12. The squared signal S12 is inputted to the differentiator 13. The differentiator 13 differentiates the squared signal S12 and thereby generates a differentiation signal S13. The differentiation signal S13 is inputted to the sign converter 43. The first signal S1 is also inputted to the sign converter 43.

The sign converter 43 performs a sign conversion process of restoring signs in a differentiation signal S13 to match them with corresponding ones in the first signal S1 based on sign-bit information contained in the first signal S1 outputted from the HPF 11. Specifically, the sign converter 43 leaves positive and negative signs in the differentiation signal S13 intact if they are identical with their respective counterparts in the first signal S1, but reverses these signs in the differentiation signal S13 if they are different from their respective counterparts in the first signal S1. The signal which is obtained from the sign converter 43 is inputted to the limiter 33 as a sign conversion signal S44. Like the limiter 33 in the third embodiment, the limiter 33 in the present embodiment makes an adjustment on the amplitude of sign conversion signal S44, and then the adjusted signal is outputted as the second signal S2 from the nonlinear processor 502. The second signal S2 is then inputted to the adder 16 as a compensation signal.

Figure 21:
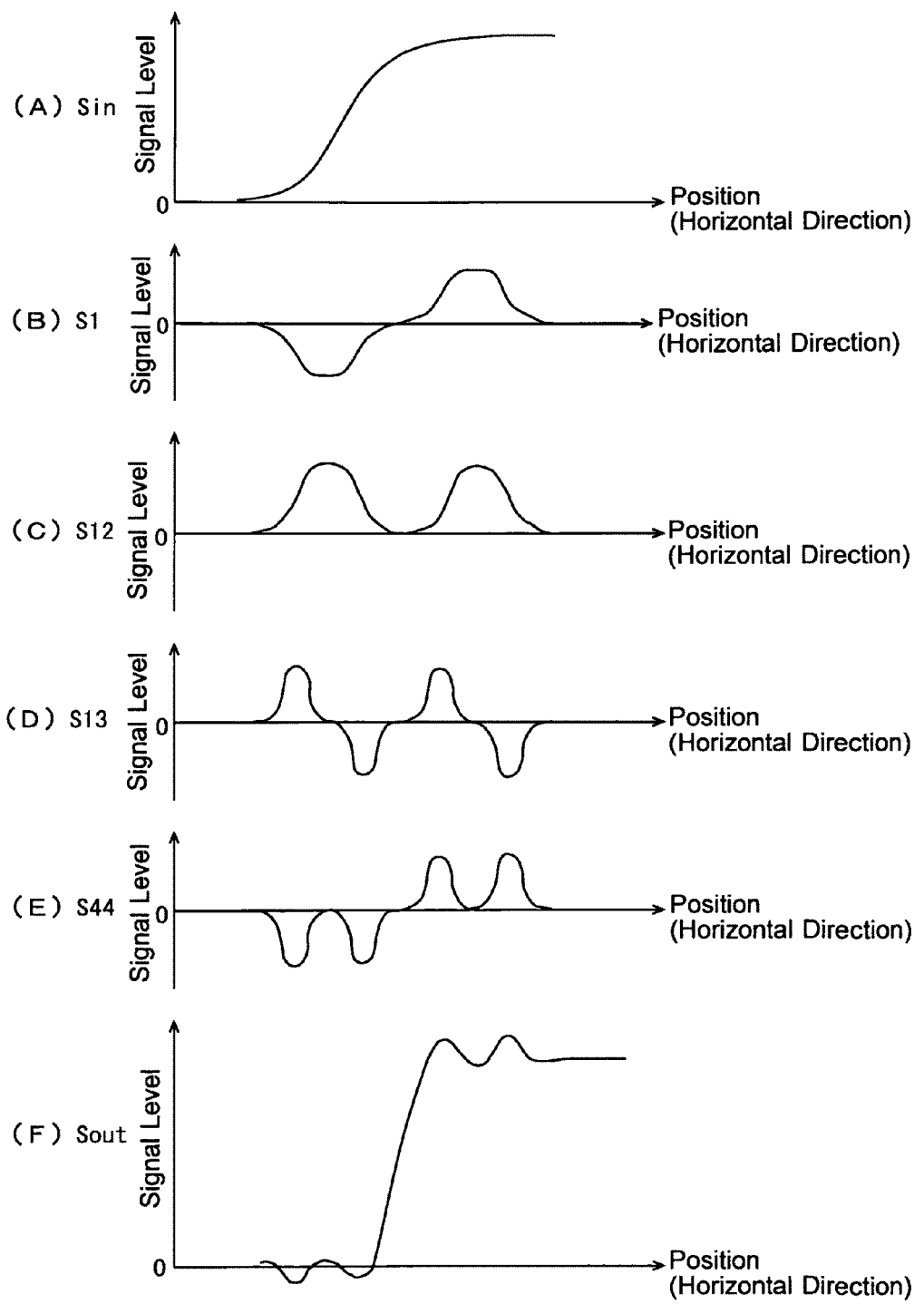
FIG. 21 includes signal-waveform charts (A through F) for describing an operation of the image enhancing device according to the fifth embodiment.

Next, description will cover an operation of the image enhancing device 500 according to the present embodiment as arranged as the above. The description will focus on a process to be performed to a portion of the input image signal Sin as shown in FIG. 21(A), which represents an edge where the level (pixel value) of the image signal changes in the horizontal direction.

When an input image signal Sin as shown in FIG. 21(A) which represents an edge is inputted to the image enhancing device 500 according to the present embodiment, a signal as shown in FIG. 21(B) is generated as a first signal S1. In the present embodiment, the first signal S1 is inputted to the square operator 12 in the nonlinear processor 502. The square operator 12 generates a squared signal S12 as shown in FIG. 21(C) from the first signal S1.

The squared signal S12 is inputted to the differentiator 13, and the differentiator 13 generates a differentiation signal S13 as shown in FIG. 21(D). The differentiation signal S13 does not contain DC components which were contained in the squared signal S12. The differentiation signal S13 is converted into a sign conversion signal S44 as shown in FIG. 21(E) by the sign converter 43. The positive and negative signs in the first signal S1 are thus preserved in the conversion signal S44.

The sign conversion signal S43 as described above receives an amplitude adjustment in the limiter 33, and then is outputted as a second signal S2 from the nonlinear processor 302. The second signal S2 is added as a compensation signal to the input image signal Sin by the adder 16, whereby an output image signal Sout as shown in FIG. 21(F) is generated. The output image signal Sout has an edge portion which rises more sharply than the conventional edge portion (FIG. 5(D)) of the image output signal generated by the conventional image enhancing device.

As understood from the above description, the second signal S2 which is added to the input image signal Sin as a compensation signal is obtained by performing a nonlinear processing to the first signal S1 (FIG. 21(B)) which is outputted from the HPF 11 as a high-frequency signal. In other words, the second signal S2 is generated from the first signal S1 by the square operator 12, does not contain DC components since they have been removed by the differentiator 13, and has its positive and negative signs matched with those in the first signal S1 by the sign converter 43. Based on nonlinearity of the process performed to the first signal S1 and preservation of the positive and negative signs which are found in the first signal S1, the present embodiment provides the output image signal Sout in which an edge portion rises more sharply (FIG. 21(F)) than the conventional edge portion (FIG. 5(D)) in the image output signal from the conventional image enhancing device, and therefore provides sharper images than conventionally enhanced images.

Also, based on the process performed by the square operator 12, the second signal S2 contains frequency components which have higher frequencies than a Nyquist frequency fs/2 which is the Nyquist frequency of the sampling frequency fs for the input image signal Sin. Therefore, the present embodiment provides greater quality improvement of images than conventional image enhancing devices which are based on linear processing. Since it is possible to provide sufficient sharpening of images with a simple arrangement as shown in FIG. 19, it is now possible to improve the quality of image not only for still images but also for moving images which are displayed in real time, without a large cost increase. Further, in cases where the input image signal is provided by an image signal which has undergone an image enlarging process, the present embodiment provides remarkable improvement in the quality of image by accomplishing sufficient sharpening of the image which has already undergone the enlarging processes as compared to conventional image enhancing devices which are not capable of compensating high-frequency ranges beyond the Nyquist frequency fs/2.

The present embodiment uses a square operator 12 in order to perform a nonlinear processing to the first signal S1. Alternatively to this, the absolute-value processor 22 which is used in the second embodiment may be used. This arrangement also provides the same operation and the same advantages as the present embodiment (see FIG. 21).

Again, in the present embodiment a square operator 12 is provided in order to perform a nonlinear processing to the first signal S1. In place of the square operator 12 a fourth-power operator which raises the first signal S1 to the fourth power may be used. In a more general sense, the square operator may be replaced by a power operator which generates a signal that is equivalent to the first signal S1 raised to a predetermined power whose exponent is two or a greater even number. Also, the present embodiment uses a differentiator 13 in order to remove DC components contained in the squared signal S12. Alternatively to this, a high pass filter (HPF) may be used. Further, the differentiator 13 is placed before the sign converter 43 in the sequence, but instead of this, the differentiator 13 or the HPF may be placed behind the sign converter 43.

6. Other Embodiments

In the embodiments described so far, nonlinearity in the nonlinear processor is based on a squaring operation, a cubic operation (more generally, a power operation with exponent of two or a greater even number or of three or a greater odd number), or on absolute-value processing. However, other nonlinear operations may be used to achieve the same effect as the embodiments described so far.

Hereinafter, description will be made for such nonlinear operations performed by nonlinear operation units, where an input signal value therefor is represented by x, an output signal value is represented by y, and a process performed by the nonlinear operation unit is represented by a function $f(x)$; ($y=f(x)$). The present invention may use a nonlinear operation unit which performs a process represented by a nonlinear function $f(x)$ which gives monotonically increasing values in a nonlinear fashion or in positive-negative symmetry. The term monotonic increase used herein means monotonic increase in a broad sense of the term. Also, it is not necessary for the nonlinear function $f(x)$ to give monotonic increase for all values of x, as far as the function shows monotonic increase at least in the neighborhood of zero. Still further, it is preferable that the nonlinear function $f(x)$ satisfies a relationship $f(x)>x$ at least over a predetermined range in the neighborhood of zero.

Figure 22:
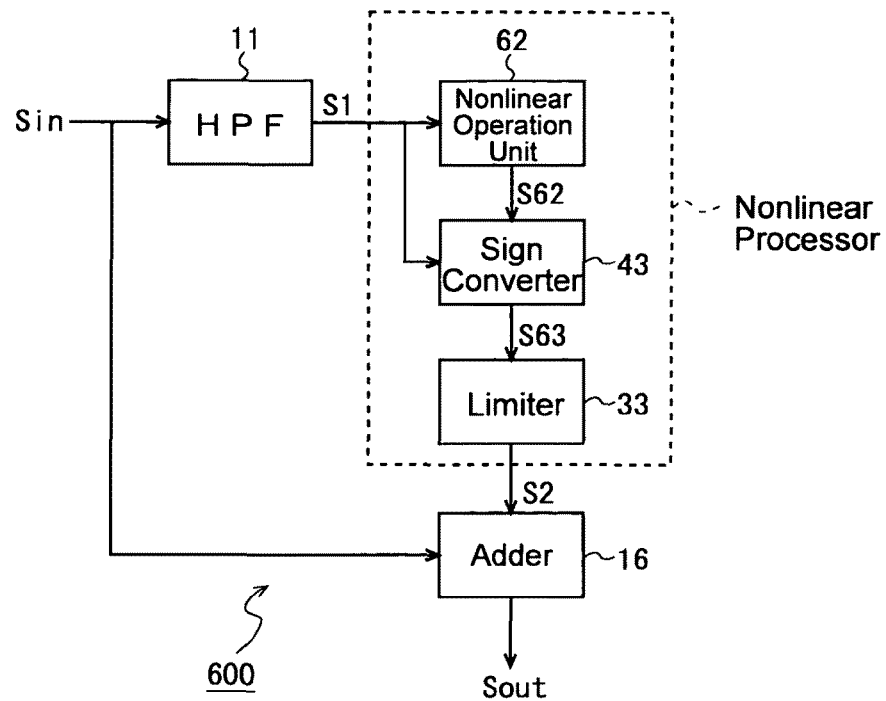
FIG. 22 is a block diagram showing a configuration of an image enhancing device according to a sixth embodiment of the present invention.
Figure 23:
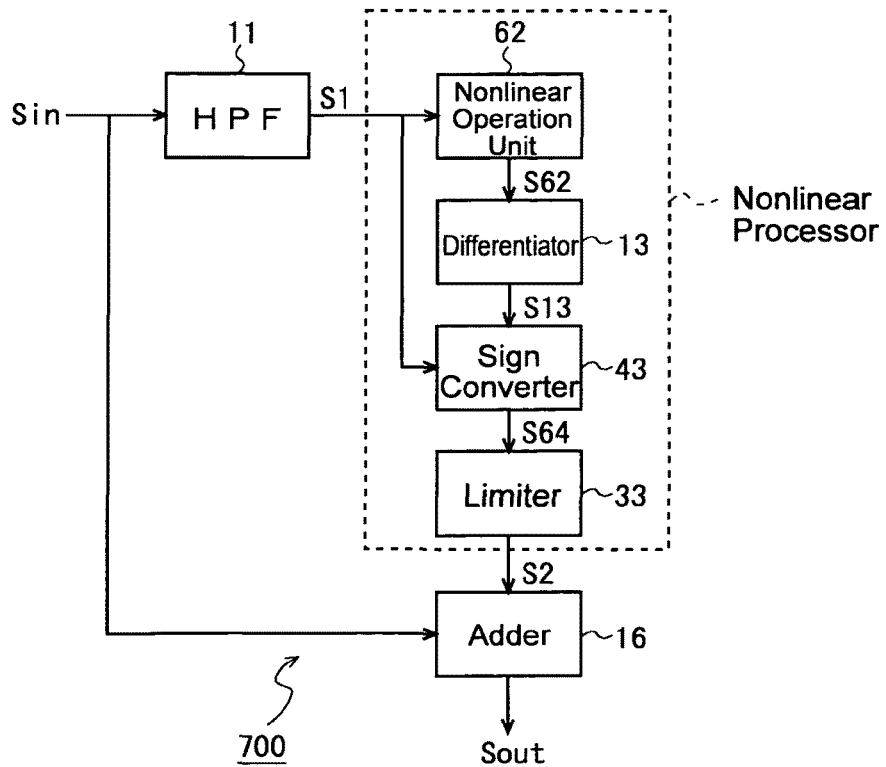
FIG. 23 is a block diagram showing a configuration of an image enhancing device according to a seventh embodiment of the present invention.

An example configuration is given in FIG. 22, in which an image enhancing device 600 uses a nonlinear operation unit 62 which performs a process represented by the above-described nonlinear function $f(x)$ which gives monotonic, symmetrical increase in positive-negative directions. Another example is given in FIG. 23, in which an image enhancing device 700 uses the nonlinear operation unit 62. These image enhancing devices are capable of adding high-frequency components which are not contained in the input image signal Sin, i.e. frequency components which have higher frequencies than the Nyquist frequency fs/2 of the original signal, and therefore capable of offering the same advantages as provided by each of the embodiments described so far. The image enhancing device 600 in FIG. 22 is the image enhancing device 400 according to the fourth embodiment, differing in that the square operator 12 is replaced by the nonlinear operation unit 62. The image enhancing device 600 in FIG. 22 may also be used in variations of the fourth embodiment in place of the image enhancing device 400 in FIG. 18. Also, the image enhancing device 700 in FIG. 23 is the image enhancing device 500 according to the fifth embodiment shown in FIG. 19, differing in that the square operator 12 is replaced by the nonlinear operation unit 62. The image enhancing device 700 may also be used in variations of the fifth embodiment in place of the image enhancing device 500 shown in FIG. 19.

In FIG. 22 or FIG. 23, the arrangement makes use of the nonlinear operation unit 62 which performs a process represented by the function $f(x)$, i.e. a nonlinear function which gives monotonically increasing values in a broad sense in positive-negative symmetry, (preferably) within a relationship of $f(x)>x$. One example of such a function is $f(x)=x^{2n}$ (where n represents a natural number). Other examples include the following functions $f(x)$:

$$f(x)=|X|^{1/2} \tag{8}$$

$$f(x)=|x|^{1/10} \tag{9}$$

The function $f(x)$ according to the expression (8) and the function $f(x)$ according to the expression (9) show large increase in the range x=0 through 1, so this range is used in an image enhancing device according to the present embodiment.

If the input image signal Sin is an 8-bit digital signal, the pixel value will be within the range of 0 through 255. Therefore, in practical use of the above functions, the pixel value x is normalized by using 255. For example, for the function according to the expression (8), the variable x on the right side is substituted by x/255, and at the same time the right side is multiplied by 255. In other words, the following function is used:

$$f(x)=255|x/255|^{1/2} \tag{10}$$

The function according to the expression (10) satisfies the condition $f(x)>x$. If the input image signal Sin is a 10-bit digital signal, normalization will be made using 1023 as the value.

Referring back to the function given by the expression (10), the function given by the expression (8) was first normalized and then multiplication was made using the value 255. However, the value for the multiplication need not necessarily be the same value used for the normalization (255 in the current example). For example, $f(x)=100|X/2550|^{1/2}$ is usable as long as the function satisfies the condition $f(x)>x$.

The above-described technique also enables such a trigonometric function $f(x)$ as follows to be used as a nonlinear function representing the process performed by the nonlinear operation unit 62:

$$f(x)=255|\sin\{(x/255)(\pi/2)\}| \tag{11}$$

7. Demonstration Using Actual Images

In order to demonstrate the advantages of the present invention, image enhancement processes according to the present invention were performed to actual images. Hereinafter, description will cover results of these image enhancements.

Figure 24:
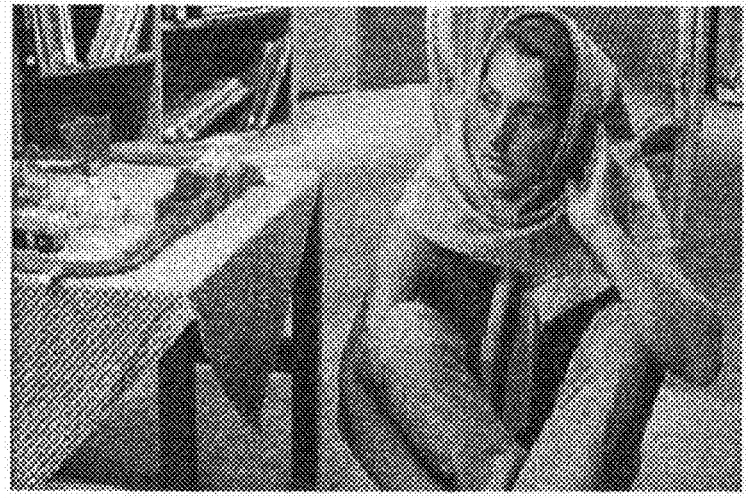
FIG. 24 shows an original image used for demonstration of advantages of the present invention.
Figure 25:
FIG. 25 shows an object image, which is an image obtained by first performing an enlarging process to the original image and then trimming the enlarged image.

FIG. 24 shows an original image (hereinafter called "original image") which was used in the demonstration to see the advantages of the present invention. Due to limited space as an accompanying drawing, this original image is reduced from the actual size of the image. FIG. 25 is an image prepared by first clipping the upper right portion of the original image and then performing an enlarging process of doubling the size both in horizontal and vertical directions. This image was used as an object for the image enhancements, (and hereinafter will be called "object image"). The object image does not contain frequency components near a Nyquist frequency Fb/2=fs which is the Nyquist frequency of the sampling frequency Fb=2fs after the enlarging process (see FIG. 8(A)). It should be noted here that FIG. 24 and FIG. 25 were prepared by using a pseudo halftone technique in view of possible cases where these images are viewed as a printed copy. This also applies to FIG. 26 and FIG. 27 which will be described later.

FIG. 26(B) is an image obtained by performing a conventional image enhancement based on linear processing to the object image. For comparison, FIG. 26(A) shows the object image. As has been described earlier, since the object image does not contain frequency components near the Nyquist frequency Fb/2=fs of the sampling frequency Fb=2fs after the enlarging process (see FIG. 8(A)), the conventional image enhancement can not make quality improvement on the object image, and there is little difference recognizable in terms of sharpness and sensory resolution between the object image in FIG. 26(A) and the one in FIG. 26(B).

FIG. 27(A) is an image obtained by performing an image enhancement according to the arrangement shown in FIG. 15 which is an arrangement using an absolute-value processor 22. A single-dimensional image enhancement was made in each of the horizontal and the vertical directions to the object image (see FIG. 9). The image in FIG. 27(A) shows noticeable improvement in sharpness or sensory resolution, mainly in such areas as the scarf and the backrest of the chair as compared to the object image in FIG. 26(A), and in this regard, the image in FIG. 27(A) is remarkably different from the image in FIG. 26(B). Therefore, it can be stated that the image enhancement according to the arrangement in FIG. 15 is capable of remarkably improving the quality of image by sufficiently sharpening enlarged images compared to a conventional image enhancement based on linear processing.

FIG. 27(B) is an image obtained by performing an image enhancement according to the arrangement shown FIG. 16 which is an arrangement using a cube operator 32. The image enhancement was made to the object image one time in each of the horizontal and the vertical directions (see FIG. 9). In this image enhancement, the input image signal Sin was an 8-bit signal; the value of the gain control constant α used in the limiter 33 was 0.03; and the upper limit value for clipping process was ±32. Comparison between the image in FIG. 27(B) and the image in FIG. 27(A) reveals that the image in FIG. 27(A) shows superior image improvement (sharpness) in the scarf and the backrest areas whereas the image in FIG. 27(B) shows superior improvement in such areas as the eyes and the lips where the image signal has small amplitudes. Thus, it can be stated regarding the comparison between the two arrangements in FIG. 15 and FIG. 16 that better results will be obtained from the arrangement in FIG. 16, i.e. an arrangement including a cube operator 32, when the image signal has small amplitudes whereas better results will be obtained from the arrangement in FIG. 15, i.e. an arrangement including an absolute-value processor 22 when the image signal has large amplitudes. In consideration of this point, therefore, it is preferable to use a configuration which includes both of the arrangements in FIG. 15 and FIG. 16, for achieving quality improvement by sharpening the entire image.

8. Other Variations

Thus far, description has been made for various embodiments of the present invention. While the first, fourth and fifth embodiments each use a square operator 12, the second embodiment uses an absolute-value processor 22, and the third embodiment makes use of a cube operator 32 for performing a nonlinear process, an image enhancing device according to the present invention may use a plurality of or combination of these first through the fifth embodiments or variations thereof (FIG. 9 through FIG. 14).

Figure 28:
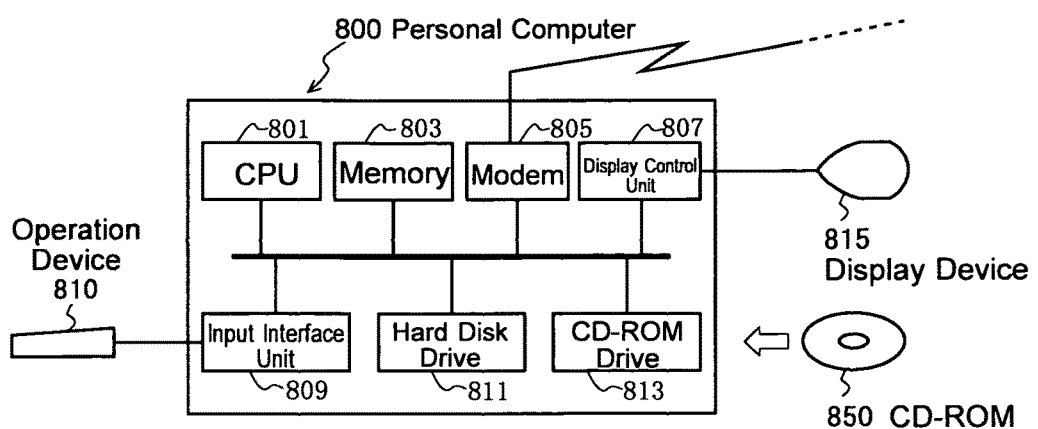
FIG. 28 is a block diagram showing a configuration of a personal computer for implementing an image enhancing device according to the present invention as an image enhancing program by means of software.

Also, while each of the embodiments is implemented in the form of hardware (circuit such as LSI), part or all of these arrangements may be implemented in the form of software. For example, an image enhancing device according to the present invention can be implemented in the form of software by using a personal computer as shown in FIG. 28 (hereinafter called "PC") and by executing a program (hereinafter called "image enhancing program") for performing any of the first, second, third, fourth and fifth embodiments shown in FIG. 1, FIG. 15, FIG. 16, FIG. 18 and FIG. 19 respectively, or other embodiments shown in FIG. 22 and FIG. 23 or variations thereof. Such an image enhancing device implemented by means of software can provide practically sufficient image enhancement particularly when used on still images, offering the same advantages as offered by those embodiments described earlier, in the quality improvement of image by sharpening the image.

The PC 800 is a general-purpose computer, and includes a central processing device provided by a CPU 801, a memory 803, a modem 805, a display control unit 807, an input interface unit 809, a hard disk drive 811, and a CD-ROM (Compact Disc Read Only Memory) drive 813. These components are bus-connected. The input interface unit 809 is connected with operation devices 810 such as a keyboard and a mouse. The display control unit 807 is connected with a display device 815 such as a CRT or a liquid crystal display device. The image enhancing program is typically offered by means of CD-ROM as a program stored in a recording medium. In other words, the user will purchase the CD-ROM 850 as a program recording medium for the image enhancing program, load the medium on the CD-ROM drive 813, read the program from the CD-ROM 850 and install the program in the hard disk drive 811. Alternatively to this, the image enhancing program may be received via the modem 805 which is connected with a communication line and then installed in the hard disk drive 811. Further, the computer manufacturers may install the image enhancing program in the hard disk drive 811 before shipment of the PC 800. Once installed in the hard disk drive 811, the user can make a predetermined operation on the operation device 810 to run the program, whereupon the program is transferred to the memory 803, stored there tentatively, and is executed by the CPU 801, allowing the PC 800 to function as a device which performs an equivalent image enhancement performed by one of the above-described embodiments or variations thereof. In the image enhancing device which is implemented by software as described above, image enhancement is performed to an object image data which is a data representing an image to be improved and is stored in the hard disk drive 811 in advance. As the image enhancing program is started, an image enhancement is performed to the object image data based on the image enhancing program by the CPU 801, and then an image data which has undergone the process (hereinafter called "processed image data") is generated and is stored in hard disk drive 811.

Thus far, description has been made for image enhancement for improving quality of images, e.g. image enhancement for improving quality of moving images for display in real time in television (TV) receivers. However, the present invention is not limited to such image enhancement as the above. The present invention is also applicable to signal processing for improved quality of sound, and to devices which perform signal processing for improved quality of contents that contains sound, etc. Also, the present invention is applicable to devices which perform signal processing to signals which are received via communication lines, for improved quality of the signals. Such signal processing devices offered by the present invention perform nonlinear processing to obtain harmonics of the original signal. Therefore, signals generated by these devices contain frequency components of higher frequencies than a Nyquist frequency fs/2 which is the Nyquist frequency of the sampling frequency fs used when making discrete signals from the input signal. Thus, these devices are capable of offering greater improvement on signal quality (sound quality, image quality, etc.) than achievable by conventional signal processing based on linear processing. Also, the improvement on the signal quality can be achieved with a simple arrangement.

INDUSTRIAL APPLICABILITY

The present invention is for application to image enhancing devices, image enhancing methods and image enhancing programs, for improved quality of image through sharpening of the image. For example, the present invention is applicable to image enhancing devices for sharpening moving images which are displayed in real time in television (TV) receivers.

LEGEND 11, 11B, 11C High pass filters (HPFs)
12 Square operator (Power operator)
13 First differentiator
14 Second differentiator
15 Multiplier
16 Adder
22 Absolute-value processor
32 Cube operator (Power operator)
33 Limiter
43 Sign converter
62 Nonlinear operation unit
100 Image enhancing device (First embodiment)
102 Nonlinear processor
110, 110B, 110C Digital filters
132 Rounder
133 Limiter
200 Image enhancing device (Second embodiment)
202 Nonlinear processor
300 Image enhancing device (Third embodiment)
302 Nonlinear processor
400 Image enhancing device (Fourth embodiment)
402 Nonlinear processor
500 Image enhancing device (Fifth embodiment)
502 Nonlinear processor
Sin Input image signal (Input signal)
Sout Output image signal
S1 First signal
S2 Second signal
S12 Squared signal (Third signal)
S13 First differentiation signal (Fourth signal)
S14 Second differentiation signal (Fifth signal)
S22 Absolute-value signal (Third signal)
S32 Cubed signal (Third signal)

The invention claimed is:

1. An image enhancing device for sharpening an image represented by an input signal, comprising:
a filter section for generating a first signal by removing, from an input signal which represents an image, at least a DC component of frequency components contained in the input signal;
a nonlinear processor for generating a second signal by performing a nonlinear process to the first signal; and
an adder section for adding the second signal to the input signal;
wherein the nonlinear processor
generates a third signal based on the first signal, the third signal making monotonic increase in a broad sense, nonlinearly or in positive-negative symmetry with respect to the first signal at least in the neighborhood of zero, and
generates the second signal based on the third signal so that positive and negative signs in the first signal are substantially preserved in the second signal while the second signal does not contain a DC component.

2. The image enhancing device according to claim 1, wherein the nonlinear processor
generates the third signal by raising the first signal to a predetermined power whose exponent is two or a greater even number, and
generates the second signal based on the third signal so that positive and negative signs in the first signal are substantially preserved in the second signal.

3. The image enhancing device according to claim 2, wherein the nonlinear processor includes:
a power operator for generating the third signal by raising the first signal to a predetermined power whose exponent is two or a greater even number;
a first differentiator for generating a fourth signal by differentiation of the third signal;
a second differentiator for generating a fifth signal by differentiation of the input signal; and
a multiplier for generating the second signal based on a product of the fourth signal and the fifth signal.

4. The image enhancing device according to claim 2, wherein the nonlinear processor includes:
a power operator for generating the third signal by raising the first signal to a predetermined power whose exponent is two or a greater even number; and
a sign converter for reversing positive or negative signs in the third signal based on the first signal if the positive or the negative signs are different from corresponding ones in the first signal, for generation of the second signal based on the third signal.

5. The image enhancing device according to claim 2, wherein the nonlinear processor includes:
a power operator for generating the third signal by raising the first signal to a predetermined power whose exponent is two or a greater even number;
a filter for generating a fourth signal by removing a DC component from the third signal; and
a sign converter for reversing positive or negative signs in the fourth signal based on the first signal if the positive or the negative signs are different from corresponding ones in the first signal, for generation of the second signal based on the fourth signal.

6. The image enhancing device according to claim 1, wherein the nonlinear processor
generates, as the third signal, a signal representing an absolute value of the first signal, and
generates the second signal based on the third signal so that positive and negative signs in the first signal are substantially preserved in the second signal.

7. The image enhancing device according to claim 6, wherein the nonlinear processor includes:
an absolute-value processor for generating, as the third signal, a signal representing an absolute value of the first signal;

a first differentiator for generating a fourth signal by differentiation of the third signal;
a second differentiator for generating a fifth signal by differentiation of the input signal; and
a multiplier for generating the second signal based on a product of the fourth signal and the fifth signal.

8. The image enhancing device according to claim 6, wherein the nonlinear processor includes:
an absolute-value processor for generating, as the third signal, a signal representing an absolute value of the first signal;
a filter for generating a fourth signal by removing a DC component from the third signal; and
a sign converter for reversing positive or negative signs in the fourth signal based on the first signal if the positive or the negative sign are different from corresponding ones in the first signal, for generation of the second signal based on the fourth signal.

9. The image enhancing device according to claim 1, wherein the nonlinear processor generates the third signal by first raising the first signal to a predetermined power whose exponent is three or a greater odd number and then generates the second signal based on the third signal.

10. The image enhancing device according to claim 9, wherein the nonlinear processor includes:
a power operator for generating the third signal by raising the first signal to a predetermined power whose exponent is three or a greater odd number; and
an adjuster for generating the second signal by adjusting an amplitude of the third signal.

11. The image enhancing device according to claim 1, wherein the nonlinear processor generates the third signal so that an absolute value of the third signal are greater than an absolute value of the first signal at least over a range in the neighborhood of zero.

12. The image enhancing device according to claim 1, wherein the nonlinear processor generates the third signal based on the first signal, the third signal making monotonic increase in a broad sense, nonlinearly or in positive-negative symmetry with respect to the first signal at least in a range where the first signal has an amplitude not greater than a half of its maximum amplitude.

13. The image enhancing device according to claim 1, wherein the filter section includes a high-frequency passing type digital filter with three or a greater number of taps.

14. The image enhancing device according to claim 1, wherein the filter section includes:
a filter for removing at least a DC component of frequency components contained in the input signal;
a rounder for replacing a signal value of a part of a signal obtained by the filter with zero if the signal value has an absolute value smaller than a predetermined lower limit value; and
a limiter for replacing a signal value of a part of a signal obtained by the filter with a predetermined replacement value if the signal value has an absolute value greater than a predetermined upper limit value, the predetermined replacement value having an absolute value not greater than the upper limit value,
wherein the filter section outputs a signal obtained by the filter through the rounder and the limiter, as the first signal.

15. The image enhancing device according to claim 1, wherein the nonlinear processor includes an adjuster for adjusting an amplitude of the second signal.

16. The image enhancing device according to claim 1, wherein the filter section generates the first signal by at least removing from the input signal a DC component of spatial frequency components in a horizontal direction of the image,
the nonlinear processor generating the second signal so that the second signal does not contain a DC component of spatial frequency components in the horizontal direction of the image.

17. The image enhancing device according to claim 1, wherein the filter section generates the first signal by at least removing a DC component of spatial frequency components in a vertical direction of the image,
the nonlinear processor generating the second signal so that the second signal does not contain a DC component of spatial frequency components in the vertical direction of the image.

18. The image enhancing device according to claim 1, wherein the image is a moving image,
the filter section generating the first signal by removing at least a DC component of frequency components in a direction of time of the image,
the nonlinear processor generating the second signal so that the second signal does not contain a DC component of frequency components in the direction of time of the image.

19. An image enhancing method for sharpening an image represented by an input signal, comprising:
a filtering step of generating a first signal by removing, from an input signal which represents an image, at least a DC component of frequency components contained in the input signal;
a nonlinear processing step of generating a second signal by performing a nonlinear process to the first signal; and
an adding step of adding the second signal to the input signal;
wherein the nonlinear processing step includes
generation of a third signal based on the first signal, the third signal making monotonic increase in a broad sense, nonlinearly or in positive-negative symmetry with respect to the first signal at least in the neighborhood of zero, and
generation of the second signal based on the third signal so that positive and negative signs in the first signal are substantially preserved in the second signal while the second signal does not contain a DC component.

20. A non-transitory computer-readable recording medium containing the image enhancing program for sharpening an image represented by an input signal, the program causing a computer to execute:
a filtering step of generating a first signal by removing, from an input signal which represents an image, at least a DC component of frequency components contained in the input signal;
a nonlinear processing step of generating a second signal by performing a nonlinear process to the first signal; and
an adding step of adding the second signal to the input signal;
wherein the nonlinear processing step includes
generation of a third signal based on the first signal, the third signal making monotonic increase in a broad sense, nonlinearly or in positive-negative symmetry with respect to the first signal at least in the neighborhood of zero, and
generation of the second signal based on the third signal so that positive and negative signs in the first signal are substantially preserved in the second signal while the second signal does not contain a DC component.

21. A signal processing device for improving a quality of an input signal, comprising:
- a filter section for generating a first signal by removing from an input signal at least a DC component of frequency components contained in the input signal;
- a nonlinear processor for generating a second signal by performing a nonlinear process to the first signal; and
- an adder section for adding the second signal to the input signal;
- wherein the nonlinear processor
- generates a third signal based on the first signal, the third signal making monotonic increase in a broad sense, nonlinearly or in positive-negative symmetry with respect to the first signal at least in the neighborhood of zero, and
- generates the second signal based on the third signal so that positive and negative signs in the first signal are substantially preserved in the second signal while the second signal does not contain a DC component.

* * * * *